(12) United States Patent
James

(10) Patent No.: US 6,810,817 B1
(45) Date of Patent: Nov. 2, 2004

(54) INTELLIGENT TRANSPORT SYSTEM

(76) Inventor: William James, 2799 Rustic Pl. #301, St. Paul, MN (US) 55117

( * ) Notice: Subject to any disclaimer, the term of this patent is extended or adjusted under 35 U.S.C. 154(b) by 0 days.

(21) Appl. No.: 10/081,981

(22) Filed: Feb. 20, 2002

Related U.S. Application Data
(60) Provisional application No. 60/271,032, filed on Feb. 23, 2001.

(51) Int. Cl.[7] .................................................. B61J 3/00
(52) U.S. Cl. ...................... 104/88.04; 701/23; 340/994; 104/88.02
(58) Field of Search ........................... 104/88.02, 88.03, 104/88.04, 88.05; 701/23, 24, 25, 26; 318/587; 246/3, 4; 340/994

(56) References Cited

U.S. PATENT DOCUMENTS

| | | | |
|---|---|---|---|
| 3,590,743 A | | 7/1971 | Larson |
| 4,630,216 A | * | 12/1986 | Tyler et al. .................. 700/229 |
| 4,766,547 A | * | 8/1988 | Modery et al. .............. 700/229 |
| 5,168,451 A | * | 12/1992 | Bolger ........................ 701/117 |
| 5,177,684 A | * | 1/1993 | Harker et al. ................ 701/117 |
| 5,289,778 A | | 3/1994 | Romine |
| 5,372,072 A | | 12/1994 | Hamy |
| 5,590,603 A | | 1/1997 | Lund |
| 5,590,604 A | | 1/1997 | Lund |
| 5,598,783 A | | 2/1997 | Lund |
| 5,775,227 A | | 7/1998 | Mullen |
| 5,797,330 A | | 8/1998 | Li |
| 5,799,263 A | * | 8/1998 | Culbertson .................. 701/117 |
| 5,979,334 A | | 11/1999 | Lund |
| 6,012,396 A | | 1/2000 | Schulz |
| 6,405,132 B1 | * | 6/2002 | Breed et al. ................ 701/301 |

OTHER PUBLICATIONS

A Review of the State of PT, J. Edward Anderson.
Problems of Duel Mode Transportation, J. Edward Anderson.
Optimization of Transit System Char., J. Edward Anderson.

* cited by examiner

*Primary Examiner*—Frantz F. Jules

(57) ABSTRACT

A public transportation system includes control by highly distributed communications, ultra-light transit vehicles suspended from single or dual rails and powered by electricity. The electric power supplied independently and supplemented by wind generators and solar panels. The transit vehicles, are suitable to transport from one to four persons. The system includes a plurality interconnected rails with main conduits and station conduits to provide non-stop transportation from one station to another station.

20 Claims, 27 Drawing Sheets

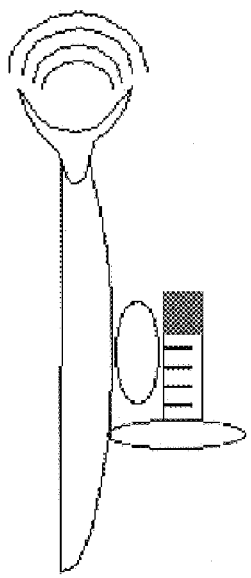

Device Communication Loop

Set Emergency Stop Counter
Repeat
  Listen On Specified Port
  Delay 1 second
  Add to Emergency Stop Counter
Until (message Received or Emergency Stop)
If (Emergency Stop)
  Execute an Emergency Stop
Else
  Set Incomplete Message Counter
  Repeat
    Accumulate message until end of message recieved
    Add to Incomplete Message Counter
  Until(message complete or Incomplete Message Counter)
  If (Incomplete Message Counter)
    Execute sequence of messages or Emergency Stop procedure
  Else
    Case of
      :(Message 1)
        Do 1
        Reply 1
      :(Message 2)
        Do 2
        Reply 2
      :(Etc....)
    End case
  End if
End if
Log this
Send summary Report

Figure 22

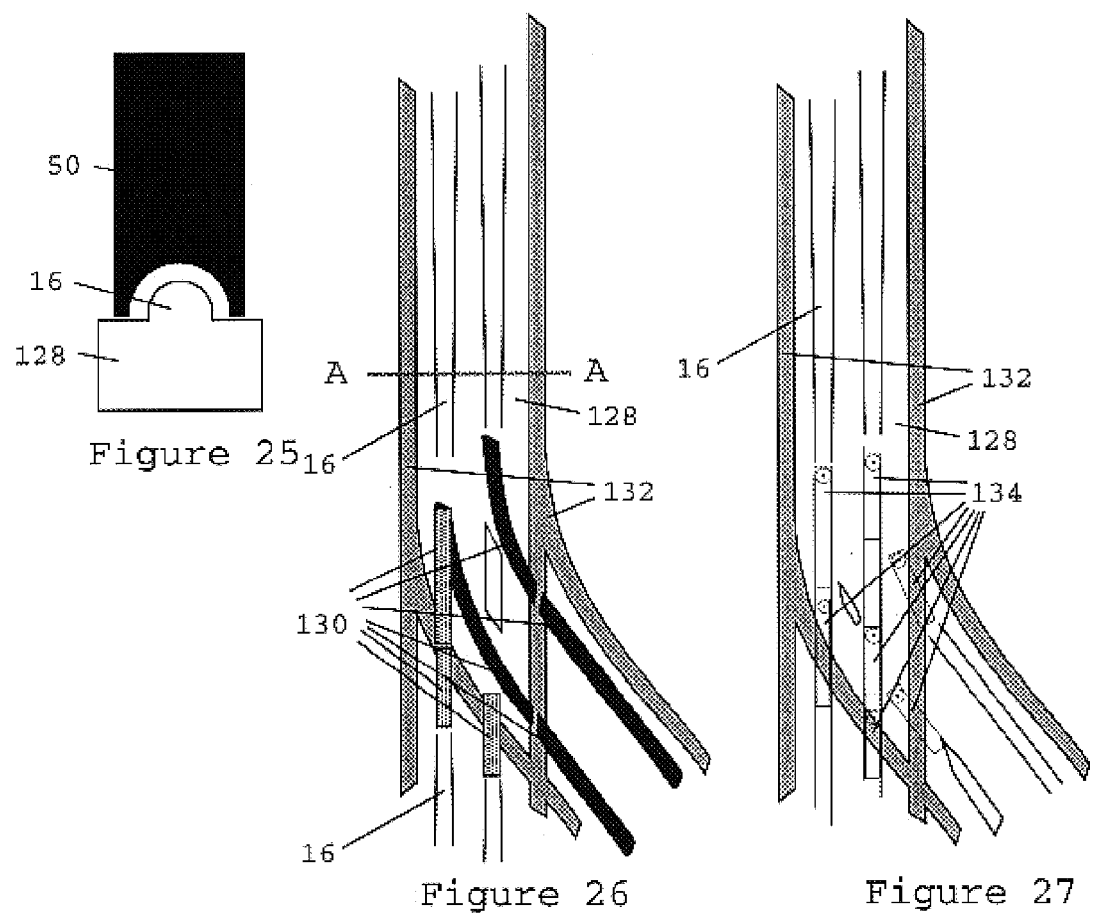

INTELLIGENT TRANSPORT SYSTEM

CROSS REFERENCE TO RELATED APPLICATIONS

This application is entitled to the benefit of Provisional Patent Application Ser. No. 60/271,032, filed Feb. 23, 2001.

STATEMENT REGARDING FEDERALLY SPONSERED RESEARCH OR DEVELOPMENT

Not Applicable

BACKGROUND

1. Field of Invention

This invention relates to a transportation system and more particularly to a system of highly distributed communications network of intelligent devices combined with ultralight vehicles suspended from rails and powered by electricity usable for the transportation of people and freight. This transportation system combination creates a convenient, energy efficient, safe, and environmentally friendly method of transportation. This system is compatible and easily integrated with existing systems.

2. Discussion of Prior Art

It has often been said that Americans have a love affair with the automobile. The economic and social values of instant access to personal transit are not so much measured as ingrained in the American culture. Americans want the freedom and benefits of instant mobility that the automobile gives. They want go where they need, when they need to go, in privacy or in the company of those they choose. Americans are willing to pay in dollars and difficulties to maintain this individual mobility. This basic requirement of the American culture is measured by the fact that, on average, there is only 1.08 people per car in rush hour traffic.

Reliance on automobile transportation to provide personal mobility has raised a number of serious problems. The most serious problem results in day to day commuting. We are moving a ton to move a person. Moving a ton to commute a person to work is wasteful and has created a dependence on foreign fossil fuels. Oil embargos, such as in 1973, are a major risk to the economy. Terrorist attacks against pipelines could have a similar effect.

Moving a ton instead of moving just the person produces far more waste gases and toxins. These wasteful by-products are damaging the environment.

The roads required to support these heavy vehicles covers vast amounts of arable land with pavement. The large size of automobiles relative to the person they are conveying adds to congestion costing an estimated at $78 billion in 1999. The long construction cycles and costly maintenance of the automobile highway system adds to economic drag.

Even without the problems of using automobiles as the sole source of personal mobility, many in America's aging population will lose their personal mobility when they lose their competency to drive.

Replacing conventional internal combustion engines with electrically powered vehicles is one solution to the current dependence on foreign countries for the fossil fuel required to power internal combustion engines. Electric vehicles have already been and are currently being developed by many major automobile companies which will be priced competitively with conventional combustion engine vehicles. Although more efficient electric vehicles will lessen the dependence on fossil fuel, replacing combustion engine vehicles with electric vehicles will not solve the problem of traffic congestion in urban areas or maintain the personal mobility of older citizens.

Traditional mass transit systems include light rail and regular rail systems as well as buses. Conventional and light rail systems have become increasingly costly to construct, maintain, and operate with the result that their use for transport of freight and interurban passenger travel has been supplanted to a large degree by use of trucks and automobiles. The estimated $30–70 million cost per mile for light rail makes it difficult to getting tax payers to fund.

Traditional bus systems in which the buses operate on fixed routes have proven simply too inefficient to compete with automobile transportation. It does not meet the primary need for individual mobility. One reason for this inefficiency is that fixed bus routes are so tied to traffic that is impossible to maintain a schedule. Also, in the low-population urban and suburban areas, at least in the US, bus routes must be spaced so widely that it is so inconvenient that only those who must use the system for economic reasons actually use the system. Aside from the general inconvenience of a traditional bus system, the travel time required by such systems is commonly so high that many potential users cannot even consider using the mass transit system without changing lifestyles significantly.

There have been many attempts to make mass transit systems more efficient. A dual-mode "Intelligent Auto/Transit" system being studied in Denmark is known as the RUF. The RUF system utilizes individual, intelligent, electric or hybrid vehicles that are capable of running on both a conventional highway and on an electrified guideway. The guideway is passive, that is it has no moving parts. This system requires electric vehicles that have significant onboard intelligence to run driverless on the guideway, and two sets of wheels and motors: one set for conventional roadways and one set for the guideway. Although this system provides for individual transport vehicles versus mass transit vehicles, the system is costly to build at approx $7 million per mile, not including the cost of vehicles.

Another type of transit system known as Personal Rapid Transit (PRT) also utilizes a passive guideway and individual active vehicles that are occupied by from one to four passengers. Although this system includes a number of improvements over vehicles and systems presently in use, it does not provide a simple and modular architecture, and is susceptible to bottlenecks and congestion. The bottlenecks and congestion would result when the capacity of a given station is exceeded. For example, if a number of passenger vehicles arrive at a respective passenger station at the same time, the vehicles may exceed the capacity of the station so that other arriving vehicles may block the flow of vehicles on the main guideway servicing the station. The PRT system does not provide a means to prevent the capacity of a station from being exceeded by the occurrence of a number of overlapping and simultaneous arrivals of vehicles at a given station. In addition, as a plurality of vehicles arrive at a station, they must be sent back (occupied or unoccupied) onto the main guideway to enable other arrivals to be handled.

Another attempt at improving traditional mass transit is disclosed in U.S. Pat. No. 5,168,451 to Bolger. The Bolger Patent is directed to a user responsive transit system in which a city is divided into numerous transit cells. Transit requests within the individual cells are serviced by small vehicles that are automatically dispatched by a computerized controller according to the user requests. In the Bolger system, the requests are entered from special terminals located at intervals within the transit cell.

Although the user responsive transit system disclosed in the Bolger Patent represents an improvement over purely fixed route systems, the Bolger transportation system has several problems which have prevented its use. One problem is that the Bolger system requires numerous transit request terminals for transmitting service requests to the computer dispatch system. These transit request terminals are so expensive that the system would be difficult to test on any realistic scale. Furthermore, the manner in which a vehicle is dispatched is inefficient. In the system disclosed by the Bolger Patent, a vehicle is chosen for dispatch based upon the minimum added distance to service the particular request. This dispatching system invariably results in vehicle backtracking. Furthermore, during a high usage period, there are so many transit requests in a small area that a single vehicle would end up going back and forth in a small area to pick up passengers and only be allowed to continue to its dispatched destinations after an excessive period of time.

The most promising of the various transportation systems which have been proposed to date are systems employing lightweight cars or vehicles suspended from overhead monorail structures such as the type of system found in U.S. Pat. Nos. 2,825,291, 3,081,711, and 3,590,743 which are typical of the suspended overhead systems. However, the problem of switching the cars from one track to another presents a problem which does not appear to have been solved by such a mechanism in a satisfactory manner, although U.S. Pat. No. 3,590,743 makes an attempt at solving this problem.

SUMMARY

The present invention is distinguished over the prior art in general, and these patents in particular by providing the required individual mobility while minimizing the moving mass of the vehicles. Instead of moving a ton to move a person, move only the person. A highly distributed network of intelligent devices provides control and safety while supporting ultra-light construction of vehicles. Suspending the vehicles under the rails further drives down the mass of the vehicles. The small size of the vehicles, rail mounting and computer controls add to safety and reduces congestion. The present invention can use alternative energy sources— wind and sun—to provide environmental protection to the system and supplement the electricity needed to power the transit vehicles. The ultra-light vehicles and immediate proximity of these alternative power sources to the system add to their viable use. The present invention does not require that the prospective user wait due to a predetermined schedule, nor does it require a prospective user share space with another person, unless desired. The system disclosed herein is easily dispatched from stations, users' homes, cell phones, and PDA's making it efficient and convenient.

OBJECTS AND ADVANTAGES

The system disclosed in this patent solves the problems of moving people by tailoring a solution to moving only the person. Americans have proved a desire to adopt transit systems that are tailored to moving individual packets. FedEx and elevators are but two such examples. System disclosed in this patent is specifically tailored to meet the needs of commuters. It applies moving only the person with the capabilities of computer networks, intelligent devices, distributed communications, ultra-light rails and vehicles to create an energy efficient on-demand transportation system.

One of several objects of this invention is to tailor a transportation system to the needs of the people and/or cargo being transported using a highly distributed intelligent communication system to achieve the lowest practical energy consumption. The highly distributed intelligent network, used in this invention, is analogous to bees; each significant device in the network has specific behaviors: actions, memory, computing, and/or communications. Each significant device has capabilities to perform its task without requiring centralized control. Centralized devices accumulate information about availability from distributed devices, and inform them of future actions or changes in the nature of the system that affects their behaviors. Centralized devices allocate resources and prevent overload based on reported availability and historical demand. Unlike the PRT system which does not provide a means to prevent the capacity of a station from being exceeded by the occurrence of a number of overlapping and simultaneous arrivals of vehicles at a given station.

Creating an energy efficient transportation system is important. The Parasitic Energy Consumption (PEC) factor compares energy efficiencies of entire transportation systems. It is based on the physics that Energy=Mass times Velocity Squared, $E=MV^2$. In a transportation system, it is nearly impossible to track the waste energy consumed by the many changes in velocities and differences in mass. The Parasitic Energy Consumption factor is a simplified technique for comparing entire systems. It recognizes the exponential aspect of the relationship between mass, velocity and energy. PEC equals the square of the moving mass of vehicles and cargo divided by the square of the mass of the cargo alone, PEC=(Moving mass)$^2$/(Cargo mass alone)$^2$. A score of one (1) is perfect, moving only the mass desired. The PEC of automobiles currently in use is approximately 147. An objective of this invention is to create tailored transportation networks with a PEC value less than 20. The goal is for vehicles to have a PEC value less than 5.

Another object of this invention is to provide an environmentally friendly means of transporting people and/or freight. The system herein disclosed reduces the impact that conventional internal combustion engines have on the environment. Improving the PEC value drives down the amount of waste products dumped into the environment. The small footprint of the rail system eliminates the need to pave over large areas. Eventually its is likely some of these will be built underground, turning long stretches where some roads used to be into parks.

The ultra-light vehicles radically reduce the cost of maintenance. Streaming loads across many vehicles moves as much cargo as heavy loads in a single vehicle.

Yet another object of The System disclosed is to provide a safe, convenient, and private means of public transportation. Potential users of public transportation around the world avoid mass transit because of the inconvenience of a set schedule and because they are forced to give up the privacy and relative security of a personal vehicle. The most used form of mass transportation is the elevator; you touch a button to call it, you get in, touch a button to tell it where you want to go, and you go whether there is one person or many persons. This invention works much the same way. You call the transit vehicle using a station kiosk, a cell phone, a PDA, a regular phone, or any other common device. Then you get in and touch a screen to tell it where to go and it takes you there. Age and driving capacity have no affect. There are no drunk or cell phone drivers. You do not have to wait for a predetermined schedule or for a full vehicle. You can choose to travel alone in a single user transit vehicle or you can travel with up to three others in a four person transit vehicle. Multiple vehicle can be linked to the same trip request to manage larger numbers.

An important object of this invention is to create a personal and public transportation system that is inexpensive to build and maintain, yet is easily integrated within the current transportation systems. Regular and light rail can be very costly to build. The light rail system currently being built in the Minneapolis area will cost approximately $3–4 billion for 2,800 miles and will take 4 years to build. The disclosed system costs about the same to build per mile as a two lane road, unlike the RUF system which is approximately $7 million per mile. Like the RUF system, the System herein disclosed can be built in existing right-of-ways which makes it easily integrated into existing transportation systems. The herein disclosed System, unlike the PRT system, provides a simple and modular architecture and can be built very quickly; approximately 10 miles per day per team.

DESCRIPTION OF DRAWINGS

For the purpose of illustrating the invention, representative embodiments are shown in the accompanying figures, it being understood that the invention is not intended to be limited to the precise arrangements and instrumentalities shown.

FIG. 22 Screen shot example of a programming loop

FIG. 25 Cross section of rail and switch table at location AA of #26

FIG. 26 Top view of a switch with movable cam rails.

FIG. 27 Top view of switch with pinball toggles.

LIST OF REFERENCE NUMERALS

Figure 1:
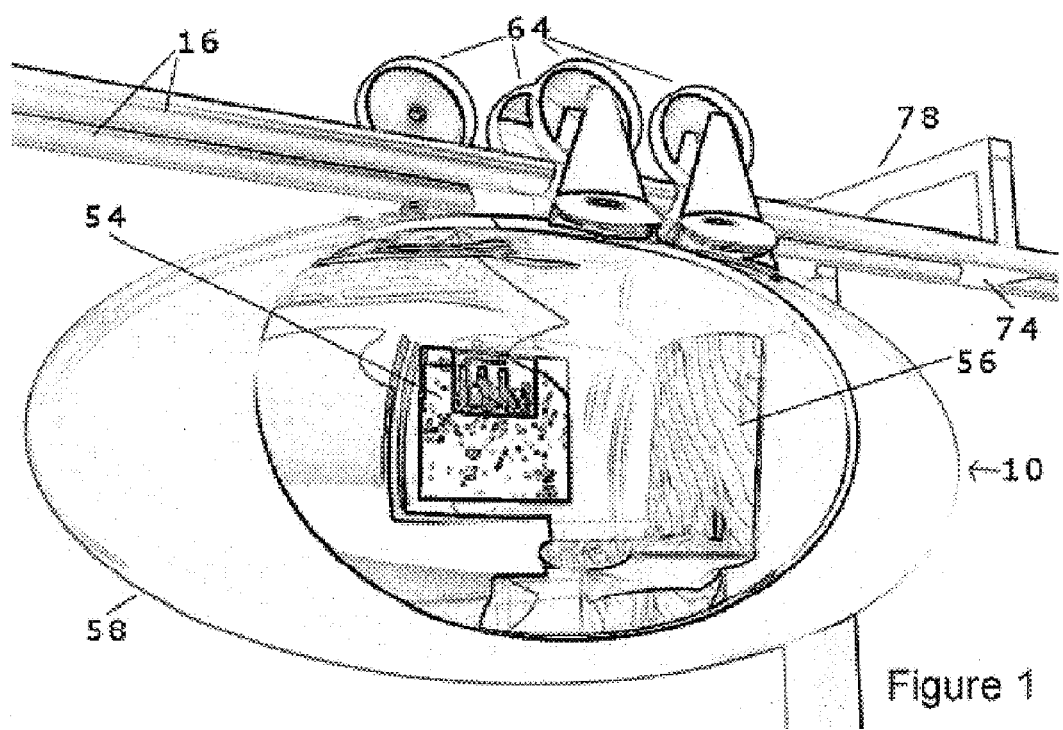
FIG. 1 Oblique view of JPod suspended from rails

10 JPod
12 CargoPod
14 LPod (LocalPod)
16 Oval Rails
18 Opposing Rails
20 U-shaped Rails (Concave)
22 Storage Areas
24 Cargo/Passenger Area
26 CPU
28 Frame Standing Shell
30 Frame LocalPod
32 Shell LocalPod
34 Wide Base Mounting Plate
36 Standing Pod
38
40 Electric Motor
42 Standoff Frame
44 Torsion Ring
46 Motor Mount
48 Standoff Assembly
50 Rolling Wheels
52 Torsion Shaft
54 Touch Screen
56 Seat
58 Outer Shell
60 Forklift Structure
62 Center of Gravity Table
64 Standoff Drive Assembly
66 Wheel Base
68 Convex Wheel
70 Drive Wheel
72 Drive Shaft
74 T-Shaped Structure
76 Safety Wheel
78 Perpendicular Structure
80 JPod Frame
82 JPod Mounting Plate
84 Station
86
88
90 Heavy Duty Drive Wheel
92 Heavy Duty Drive Shaft
94 Heavy Duty Safety Wheel
96 Heavy Duty Motor Mount
98 Heavy Duty Torsion Ring
100 Heavy Duty Standoff Drive Assembly
102 Heavy Duty Standoff Frame
104 Heavy Duty Motor and Controls
106 Heavy Duty Torsion Shaft
108 Heavy Duty Rolling Wheel
110 Station Rail Assembly
112 Unload Rails
114 Dismount Rails
116 Elevator
118 Storage Area
120 Load and Unload Area
122 Stairs
124 Warehouse Location ID
126 Heavy Duty Mounting Plate
128 Switch Table
130 Cam Rails
132 Slots
134 Pinball (Toggle) Levers
136 Wheel With Pick up Brushes -continued

LIST OF REFERENCE NUMERALS

138 Brushes
140 Ultra light Frame

DESCRIPTION OF INVENTION

The present invention will now be described in detail for specific preferred embodiments of the invention. The system is comprised of a number of interrelated devices and networks some of which are already in existence and may be used with some alteration and others of which are already within the state of the art but not combined into one operable system. These embodiments are intended only as illustrative examples and the invention is not to be limited thereto. The physical design of new vehicles, rails, control devices or programming techniques is not intended to diminish this invention's intention to create a highly distributed intelligent network of efficient transportation devices.

One embodiment of the present invention is an intelligent transportation system that comprises transit vehicles, also referred to as pods in some configurations, rail networks, sensors, control devices, distributed communications and a database component or components, which are integrated into an efficient, intelligent transportation system representing networks. Some specific embodiments of transit vehicles include JPods for commuters, LPods for local traffic in neighborhoods or buildings, CargoPods for cargo transport and delivery, GPods for golf or other recreational activities, and other specialized transit vehicles. Indeed, various transit vehicles could be available in a single intelligent transportation system, upon request or in anticipation of a demand.

Figure 21:
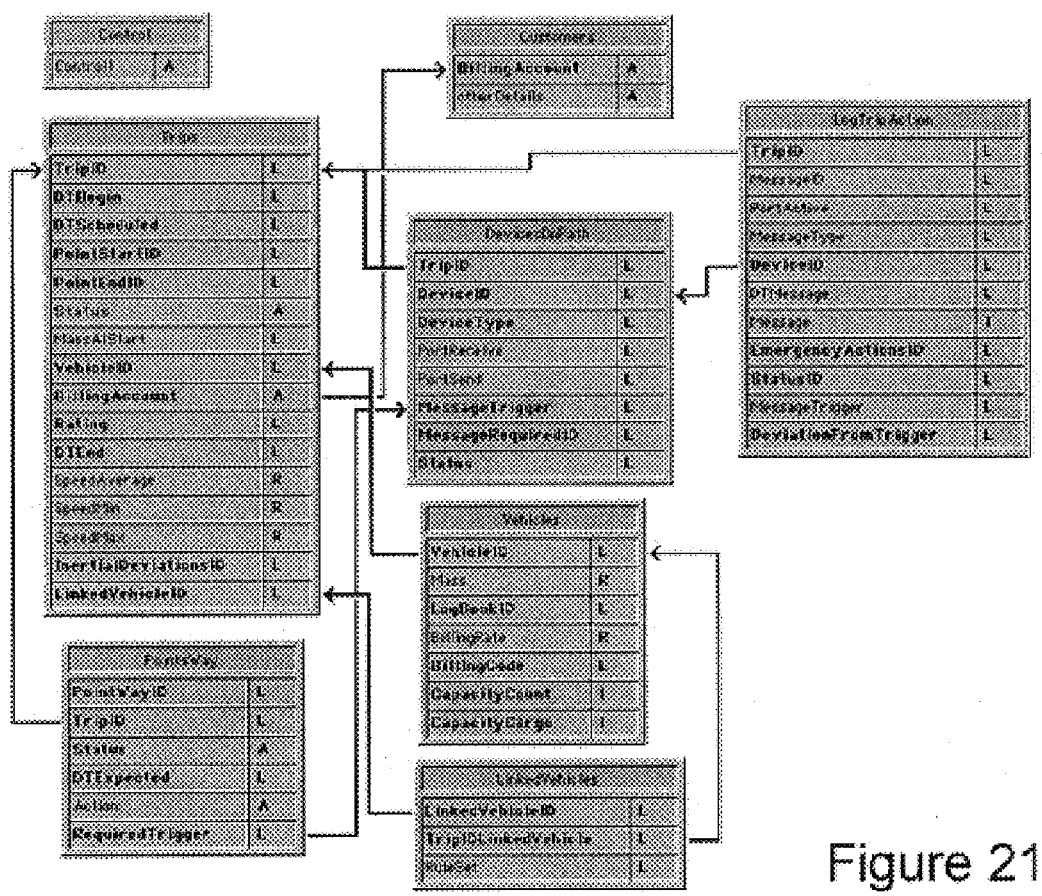
FIG. 21 Screen shot of database of tables and fields for vehicles
Figure 30:
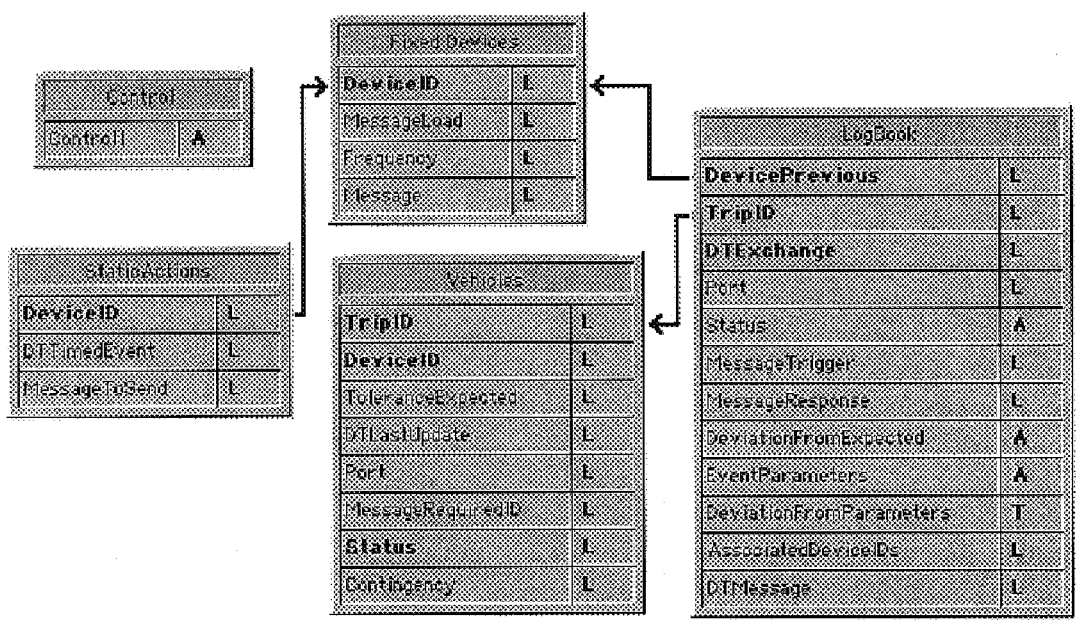
FIG. 30 Screen shot of a database of tables and fields for switches

The distributed communication system is the same in all embodiments of the invention. Distributed communication means that local actions are communicated, coordinated, and implemented locally without requirement for centralized action or approval. Every significant device operates with a communications loop (FIG. 22), database of actions it is to perform (examples FIGS. 21 and 30), behaviors it is to implement at estimated times as stored in its database and a logbook of actions completed. Devices report their availability, based on what they are scheduled to perform, to the dispatching system. Control is not dependent on a central dispatch. Local, regional, and central reporting computers accumulate reports of device availability, which determines system availability. The dispatching computer, to offer and plan routes for new trip requests, uses these reports of availability. When a route is booked for a trip, the dispatching computer sends corresponding data to each device involved. Each device involved records its time-based capacity and reports to the dispatching computer. Communications, ports, messages, and other details, that devices share is added to the database accessible by each device. Each device performs its specialized functions and communicates with the other devices as required by its behaviors.

Figure 23:
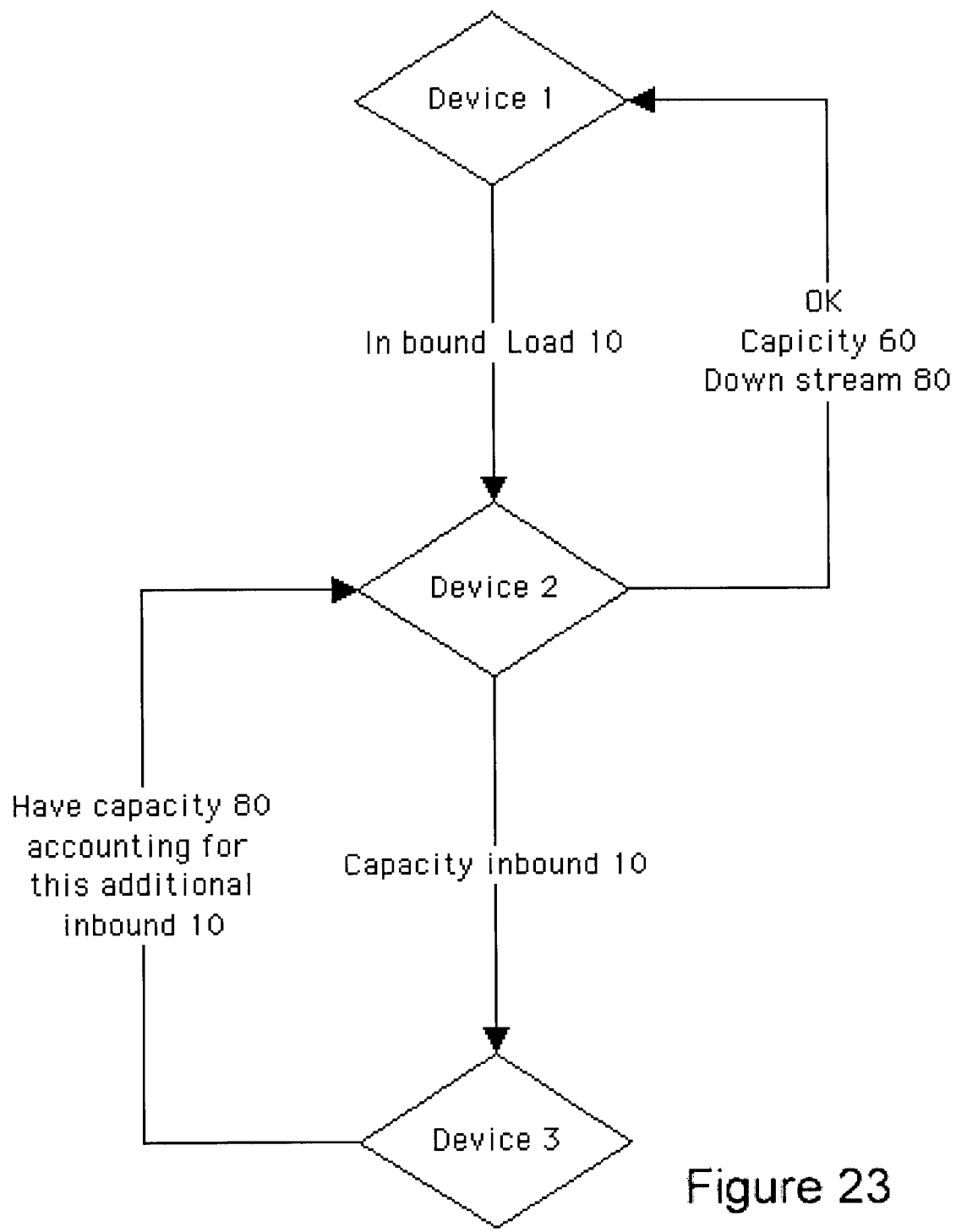
FIG. 23 Flow chart of the communications between static devices

In a more specific embodiment, when a user of the transportation system requests a trip, dispatching computers look for available routes that meet the request requirements for starting point, destination, waypoints, security, distance, and other factors. Security features specify whether the user can modify the destination while in progress. The user may specify routes from start point to destination point. Routes may be specified for start, end, and waypoints. Routes may be specified for each device on the route with specific security/encryption requirements. When very specific routes are selected, dispatch operations will book with each path device or its storage supervisor (local devices may save their future load events remote from their own memory) the load expected, at an expected time with the expected communications with the engaged devices. Additionally, the user could specify a destination with/or without specifying a route or waypoints. Routes may be defines with a number of parameters. FIG. 23 is an example of the communications between static devices to signal availability. Once the dispatching computer selects an appropriate route, it provides a list, to the vehicle's computer, of all devices along the route. A message is also sent to every affected device, which is stored in its memory of what future tasks are required at what estimated time. The vehicle and the devices encountered along the route execute each specific action required, at a specific time, on a specific port. The database components of this specific embodiment are relational records stored and accessible in a way that supports the independent behaviors of the distributed devices. Database examples are displayed in tables and fields format. The exact format of the data will vary with programming techniques. Tables have multiple records with data fields similar to those indicated as in FIGS. 21 and 30. The ability to provide independent behaviors is critical. Methods for providing, transmitting and packaging this data will vary with technologies and budgets.

The devices engaged in activities ensure the safety and efficiency of the transportation system by coordinating, setting, and maintaining transit vehicle intervals. System devices query transit vehicles on maintenance status, and based upon predetermined settings send transit vehicle to maintenance. Devices predict traffic congestion problems in advance based on routing information, and reroute traffic to avoid predicted congestion problems, while maintaining safe speeds within the network. Devices compare sensor values from other devices in an event against their own and determine deviations. These deviations affect the safety margins that are applied. Safety standards are based on Statistical Process Control principles for deviation between compared readings of engaged devices and implementing actions that result in the best available outcome. Each transit vehicle has a redundant system of safety measures that determine the distance and speed of transit vehicles ahead and behind the transit vehicle. The transit vehicle communicates as part of the network to the surrounding transit vehicles, creating a system of multiple safety checks. If any of the safety systems do not receive a safe condition from other devices an unsafe condition is triggered, the portion of the network affected is rerouted, slowed, or halted by their programmed behaviors or by an emergency message from an appropriate source. The default condition is to stop unless devices being approached report a safe condition.

Accumulating devices analyze patterns within the system, trips, and other factors and redirect trips to optimize system availabilities. Accumulating devices are able to provide best route information for trips. They also adjust traffic routes due to outages, to minimize switching events and to provide other benefits. An intelligent transportation system can be constructed using above-the-rail vehicles. Generally, above-the-track vehicles require a higher PEC value; because of this, they are less desirable.

Figure 8:
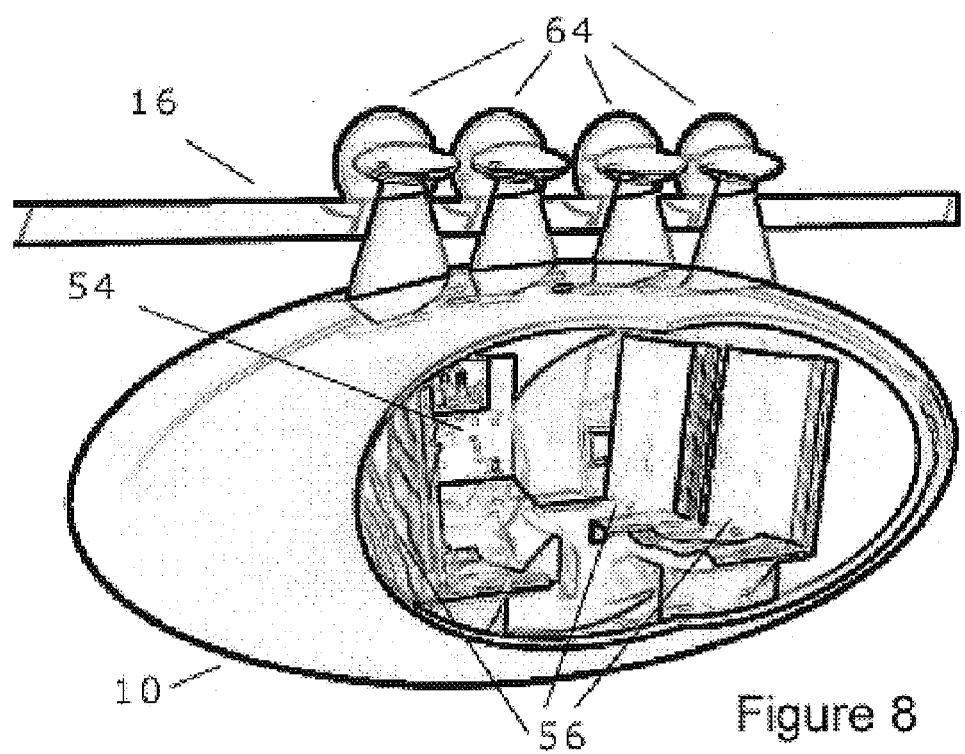
FIG. 8 Oblique view of single rail and 4 seat JPod

In a specific embodiment, transit vehicles travel suspended from at least one rail 16 as shown in FIG. 8. More preferably, transit vehicles travel suspended from two rails 16 as shown in FIG. 1. Suspended transit vehicles are a preferred embodiment, because they reduce the overall mass of the transit vehicles, which reduces the PEC value. Suspended devices are also preferred since the combined mass of the transit vehicle and the cargo adds to the stability of transit vehicle.

Figure 5:
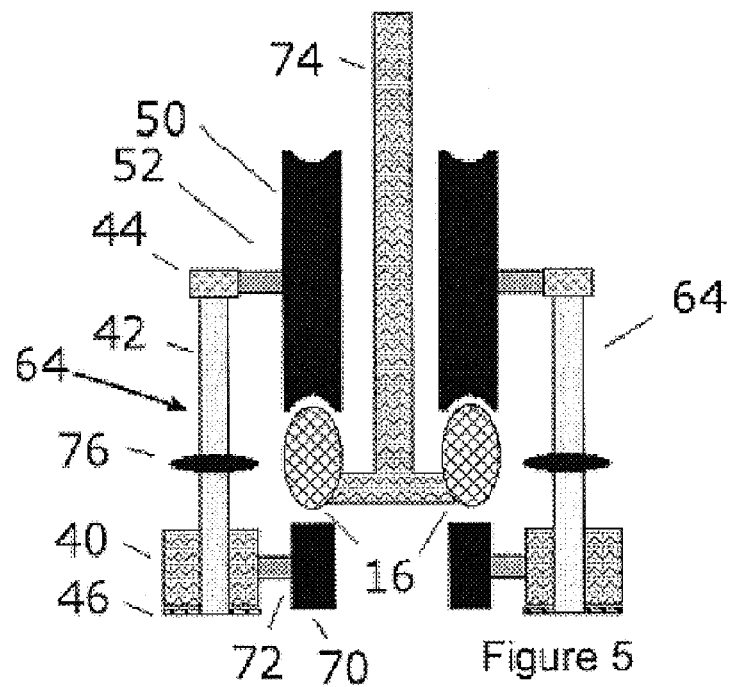
FIG. 5 Front cross section of standoff drive assembly preferred
Figure 6:
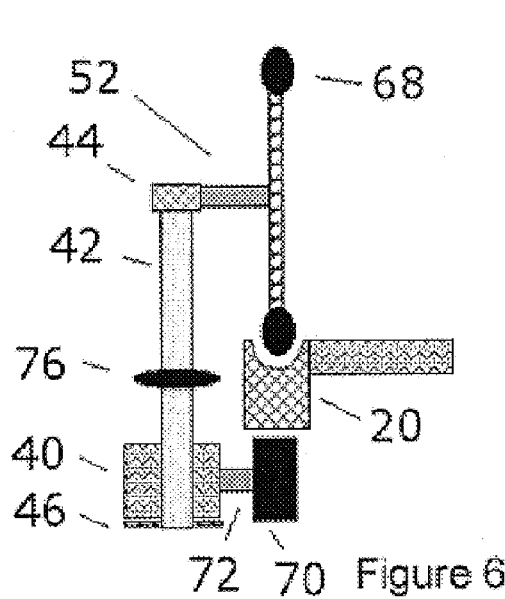
FIG. 6 Front cross section of standoff drive assembly convex wheel
Figure 7:
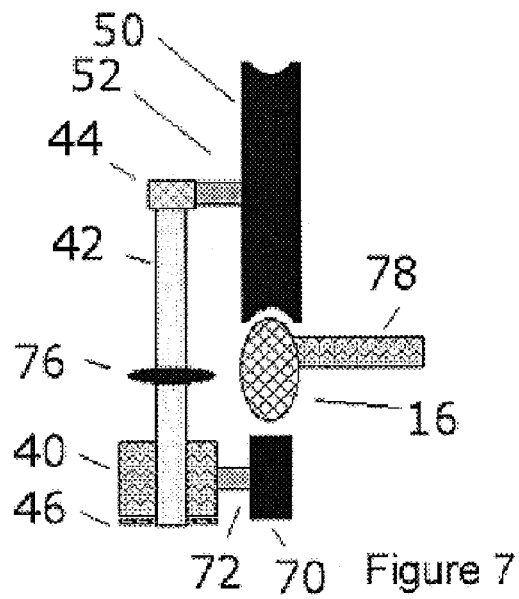
FIG. 7 Front cross section of standoff drive assembly Single Rail
Figure 28:
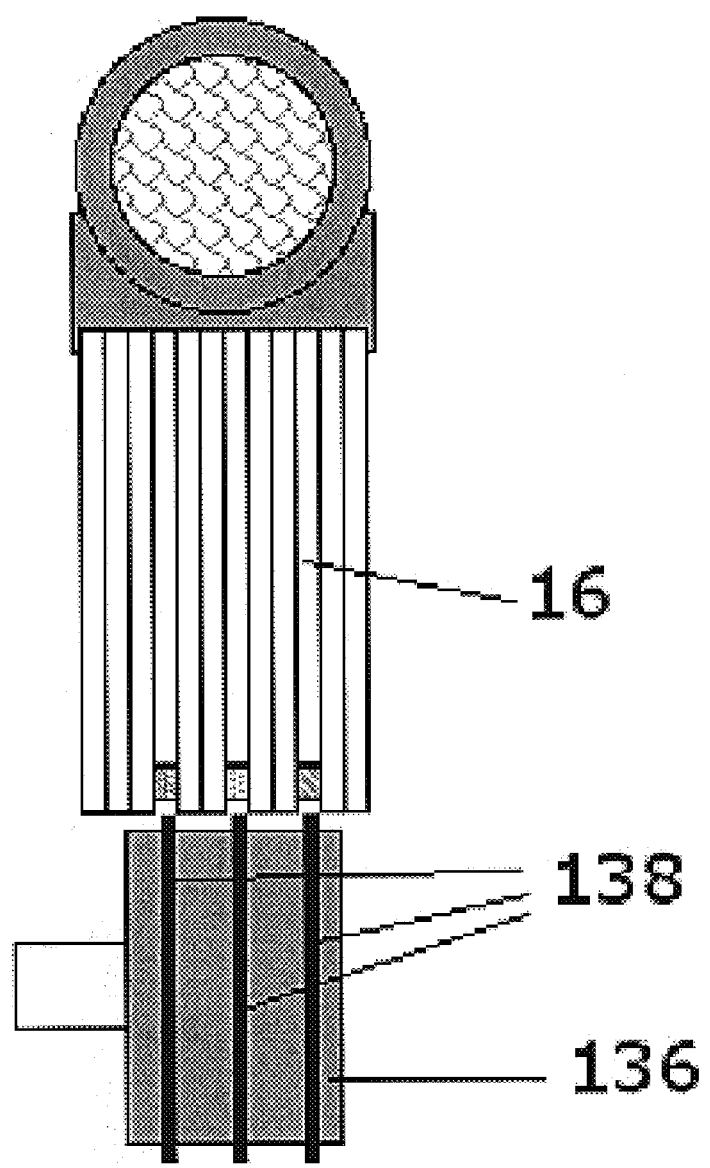
FIG. 28 Cross section of laminated rail structure

One rail 16 is preferred if achieving the lowest cost implementation is a primary objective. In this case, inertial shifts of the transit vehicles are most likely and must be tolerated or countered. Two rails 16 are preferred, if costs permit, to increase stability. The rails 16 vary in shape and construction. In one embodiment, the rails 20 are concave with a convex wheel 68 riding in the groove as shown in FIG. 6. In a preferred embodiment, the rails 16 are round on top with a laminated vertical supporting structure, FIG. 28. The rails 16, in this embodiment, supply power and communications, although it is possible for the communications to be wireless and for the transit vehicle to carry its own power. A brush pickup wheel 136 would be used in this configuration. In another preferred embodiment FIG. 29, the rail 16 is U-shaped with the slot or opening facing down and the riding wheels 50 facing outwardly and riding inside the U-shaped structure. This embodiment is the most stable, but also the most expensive. One other embodiment, shown in FIG. 5 is for the rails 16 to be a simple oval design, and the riding wheels 50 are concave.

Figure 9:
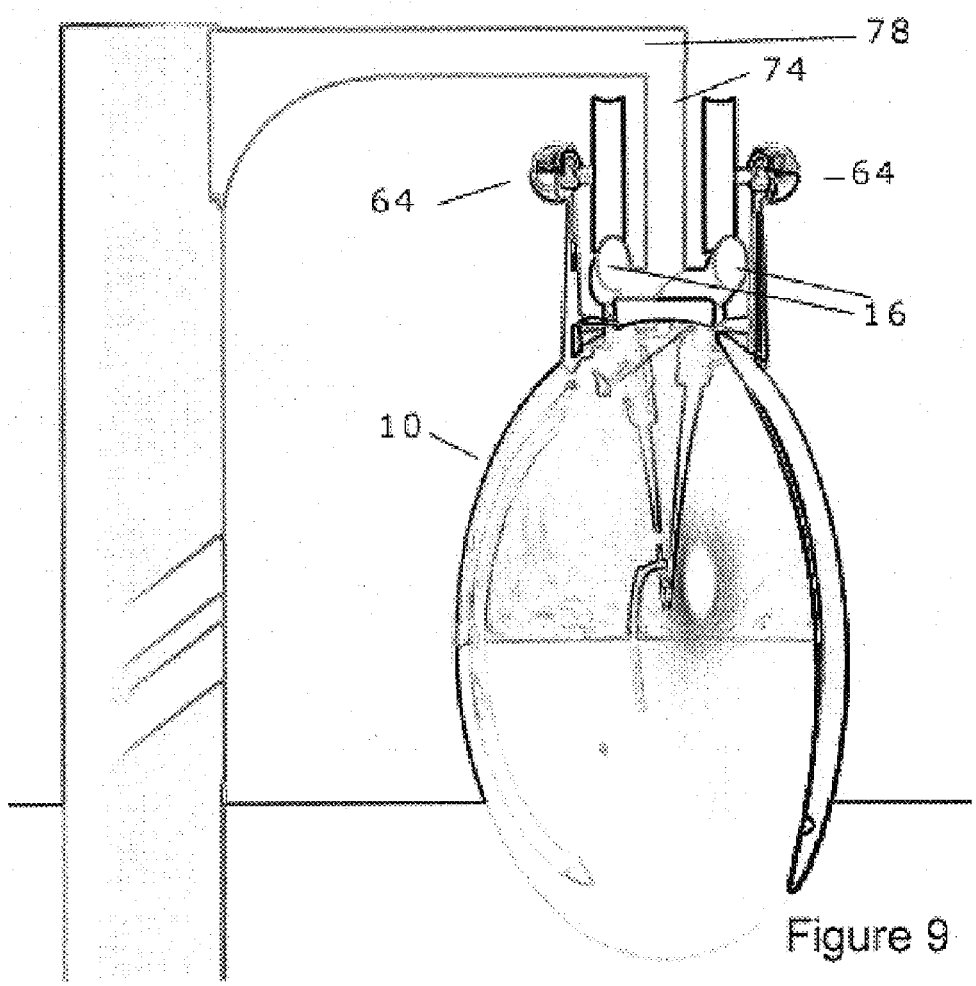
FIG. 9 Front view of JPod showing perpendicular rail support structure
Figure 10:
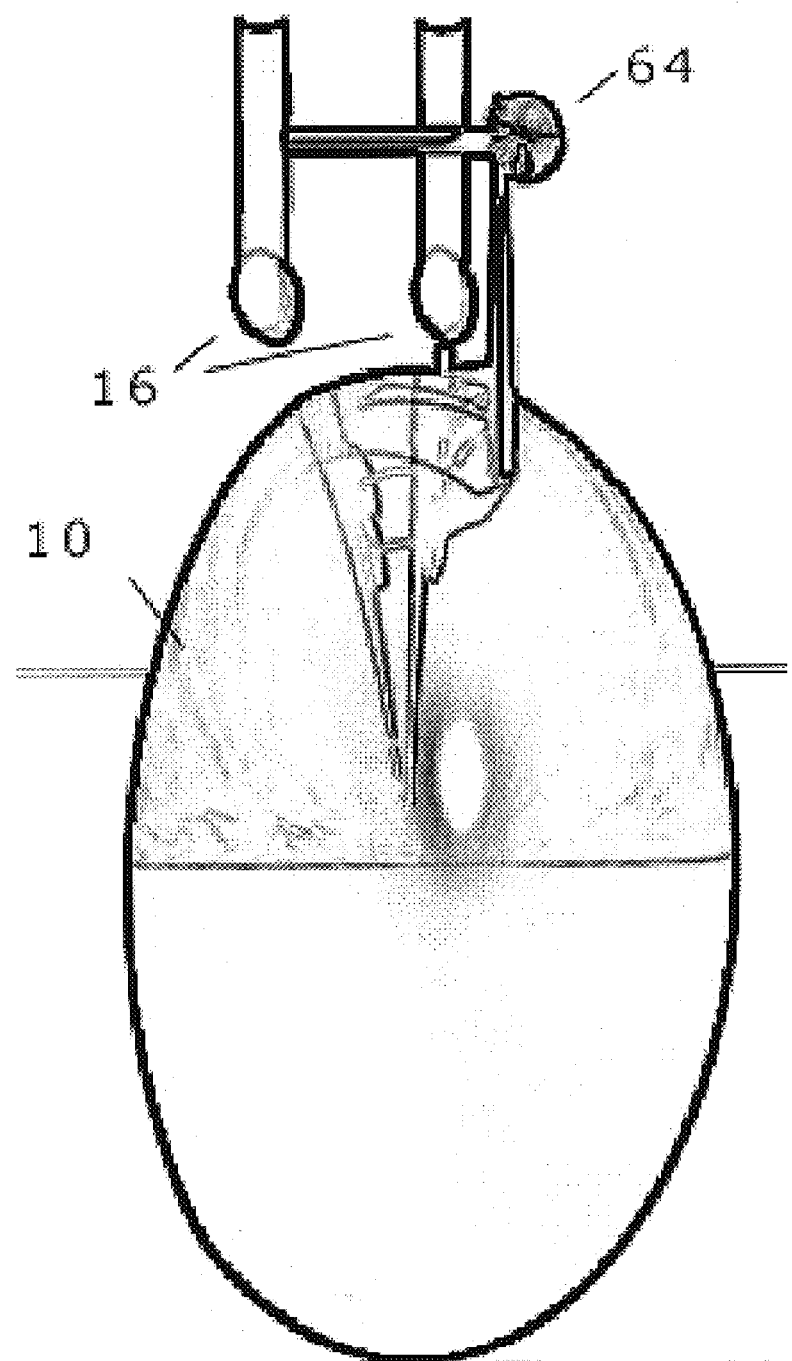
FIG. 10 Alternative structure of rails
Figure 29:
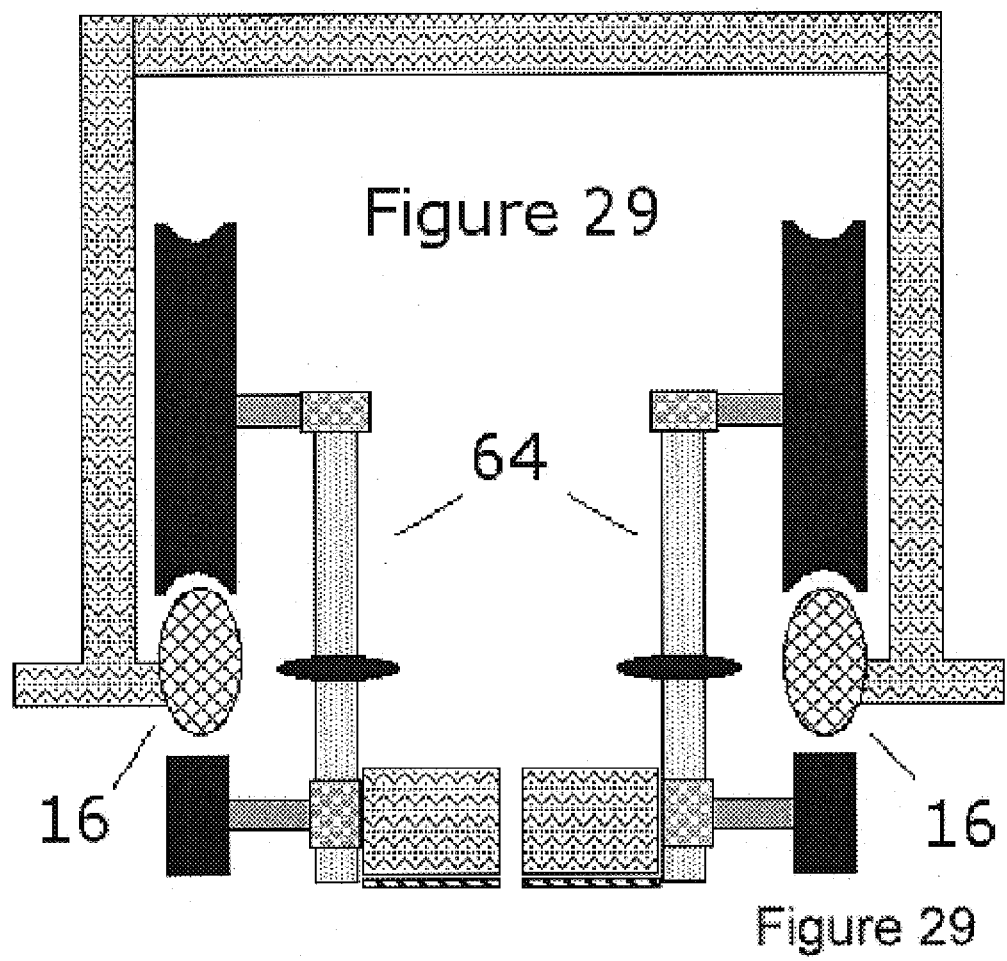
FIG. 29 Cross section of an alternate standoff drive assembly.

The rails 16 reduce the number of variables required to control vehicles. FIG. 5 illustrates the rails 16, in one preferred embodiment. Although FIG. 5 is used to describe the connections of the rail system 16, it is possible to interchange the concave rail 20 with convex wheel 68. The rails 16 connect to an upside down "T" shaped structure 74. The "T" structure 74 attaches to a perpendicular support structure 78 as illustrated in FIG. 9. The perpendicular support structure 78 allows the rails 16 to connect to a column, building, bridge, or other supporting structure in a manor that best meets the system/structure interface for each network. FIG. 10 illustrates yet another of the many embodiments the transit vehicles and rails 16 can take. The transit vehicle, in this illustration a JPod 10, is to one side of the rails 16, with the shaft 52 of the first two riding wheels 50 extending out over the first rail 16 to the second rail 16, the one furthest from the standoff assembly 64. The rails 16 in FIG. 29 are supported by two upside down T-shaped structures 74. The T-shaped structures 74 are connected together at the top with a perpendicular support structure 78.

Figure 19:
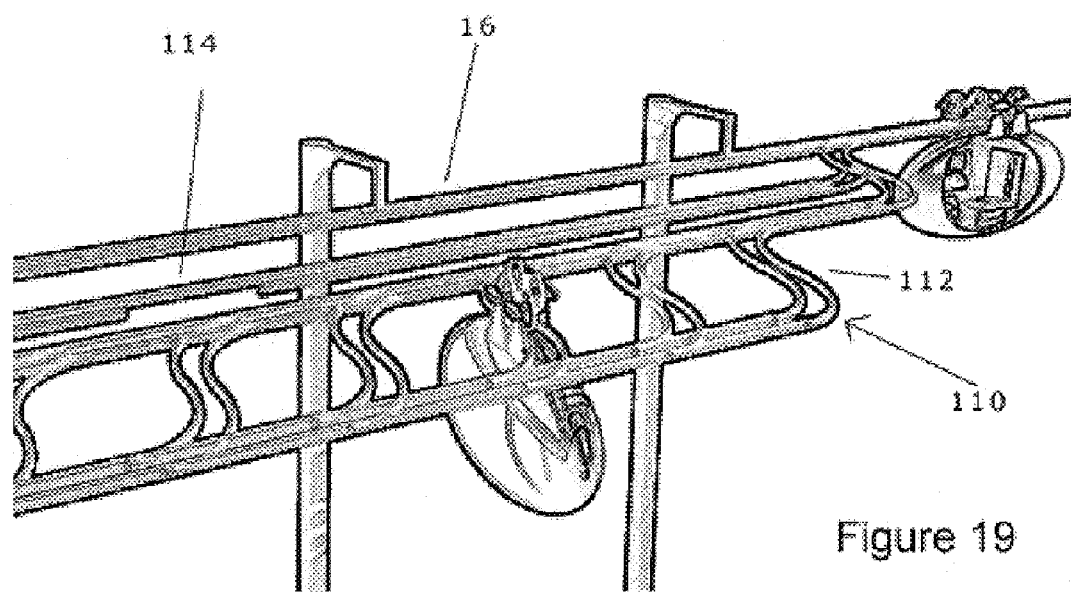
FIG. 19 Oblique upper view of rail assembly for station
Figure 24:
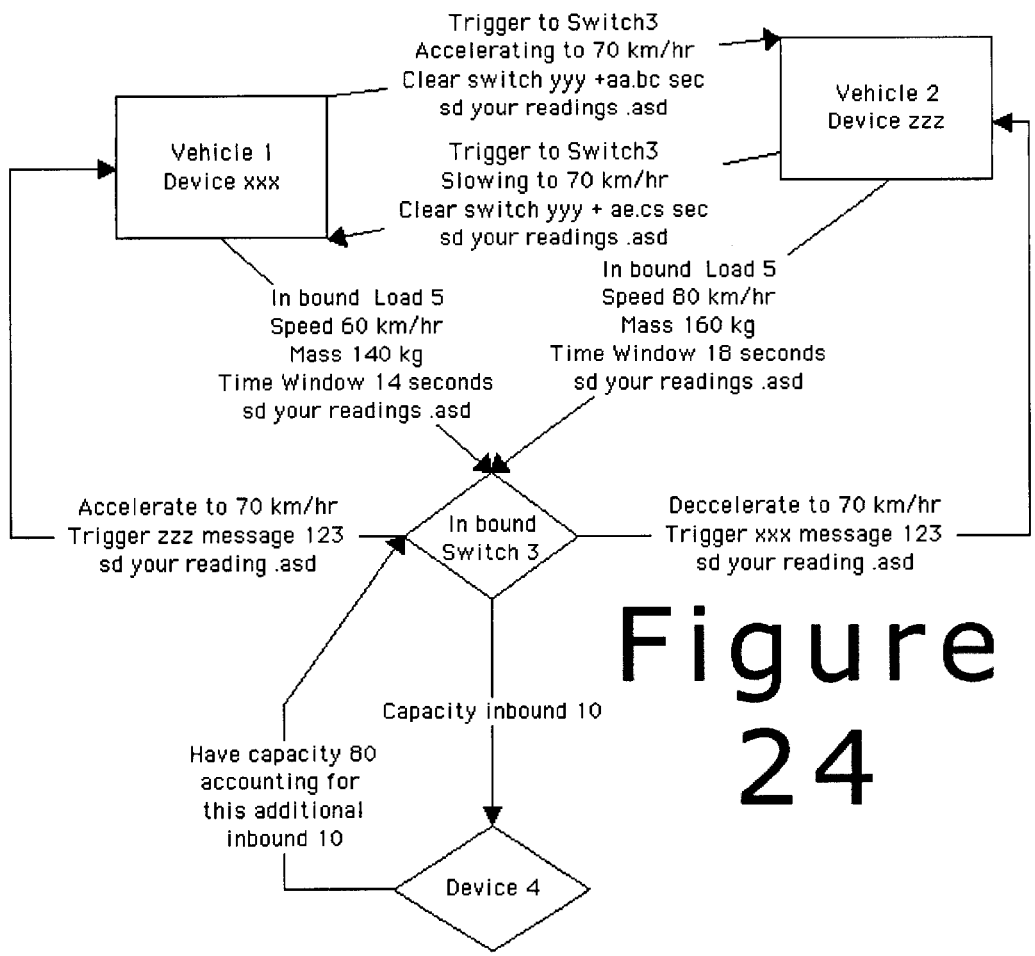
FIG. 24 Flow chart of a conversation between vehicles and switches

FIG. 19 illustrates that at a station 84 can have multiple orientations for rails, 110 for unloading/loading and 114 for vehicle dismounting. This allows transports devices to maintain traveling speed while passing a station 84. The transit vehicles scheduled to stop exit off the main rails 16 and proceed to the load/unload area. If the transit vehicle is private or not currently needed, it can proceed to the dismount rails 114 for storage 118. If intelligent transportation system's distributed communications network is applied to an above-the-track configuration, then it could use most standard switching techniques. Switches are mechanically complex. Except on dedicated one-way routes, the switches operate in either direction. Suspended vehicles have added complexities for how the structure that connects the riding wheels 50 to the transit vehicle, passes through the rails 16 when encountering switches. Switches must meet all safety requirements of the transportation system. Switch station 84 must have a mechanical means of switching, in rapid succession, pods from one track to another. There are a number of ways to accomplish this. FIG. 24 shows an example of the communication between merging transit vehicles and the switch. One embodiment, illustrated by FIG. 27 shows toggle or pinball levers 134 that open to allow the transit vehicle's supporting structures to pass through. In this embodiment, a pinball switch operates a series of levers 134 to connect rail 16 elements and open gates for the suspended components to pass through. In another embodiment, FIG. 26, there is a riffle or shuffle switch configuration in which small cam devices 130 rotate out of the way to allow the supporting structures of the transit vehicle to pass or they close allowing a vehicle to travel on it. FIG. 25 shows that in a preferred embodiment, a table 128 elevates relative to the rails 16 so the outer portions of the riding wheels 50 lift the concave portion of the wheels 50 off the rails 16. The wheels 50 run on their outer rims. This reduces the size and mass of the components that must open and close to allow transit vehicles to pass. Guides may also be applied from above the wheels to direct the wheels through the switch. With the low mass of a vehicle it is also practical to lift one rail and/or lower the opposing rail to create a momentum shift to help direct a transit vehicle through the switch.

FIG. 24 shows an example of conversation between devices approaching a switch. Communication events are required by the system and are recalled by each device from its database of events. In the case where vehicles are coming from two tracks, the switch controls communications with vehicles on each inbound rail 16 and posts the address and distance for engagement of significant in bound vehicles. Each of these inbound transit vehicles also communicates with the other in bound transit vehicles to compare location, speed, mass, conditions, etc. . . . Transit vehicles and switches compare results and subtract from the required wide safety standard down to the minimum safety standard based on each reading and the standard deviation between these readings. As the vehicles slow down or speed up, they communicate this to their trailing and leading counterparts. These in turn communicate their actions and values to other surrounding involved devices. Each device stores in its log book the values of its readings and the comparisons with other devices involved in a motion sequence. The readings of all involved devices shall be compared against the values submitted by other devices. Devices are replaced or repaired if their values begin to drift from acceptable Statistical Process Control standards. Emergency actions shall be triggered if values indicate unsafe conditions exist.

If no signal is present, due to device failure or any other reason, then no action is permitted. This lack of signal affects every device on which the address of the non-communicating devices is dependent. The lack of signal from downstream devices affects the options the upstream devices may execute. The overall system notes that the address is not communicating, and that affects all future trip requests that would require that address. Each device that is affected, evaluates its available options within the parameters that its program defines. As vehicles request adjustments to their route identifier, and those requests are approved, the load on the system adjusts to show available loads. Switch stations or tables 124 have one or more sensors for detecting the location and speed of pods, a communications receiver/transmitter for communicating with the dispatching computers and for communicating with the transit vehicle's computer. Communication with the dispatching computers is not required for action; it reports about loads and availability because it affects other activities.

The sensor elements could include a laser range finder, proximity sensors, infrared sensors, and other sensors. Another sensor element could use electromagnetic waves to determine the locations of multiple transit vehicles, such as accomplished by the radar sensors in aircraft and at airports. Sensing the location of a transit vehicle could be a part of the rail 16; each length of a rail 16, in this embodiment, can have an address and reports it to the transit vehicle as it passes. It also reports to the next significant fixed device along the trip route. In another embodiment, the sensor element determines the location by receiving the speed directly from a speed indicator on the pod, and the location from proximity sensors on the rails 16 at known distances from the switch. Other means of sensing the location of the transit vehicles, the speed of the transit vehicle and for switching the transit vehicle from one track to another would be obvious to one skilled in the art, and are included within the scope of the invention.

Figure 16:
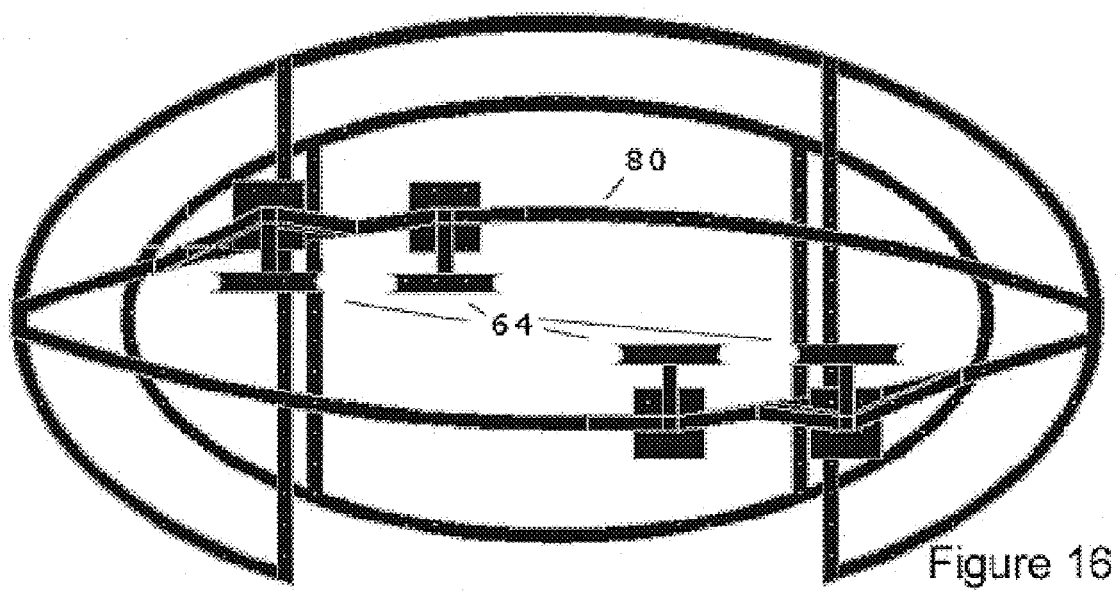
FIG. 16 Top view of JPod frame
Figure 17:
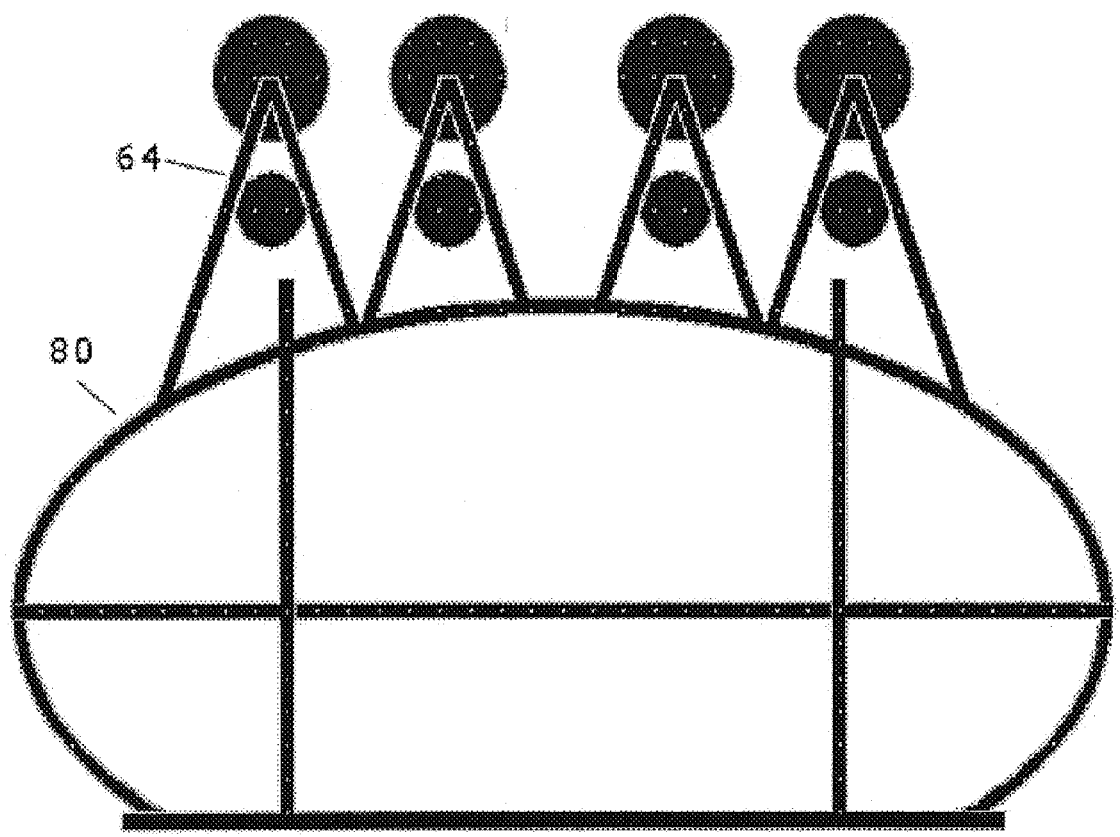
FIG. 17 Side view of JPod frame
Figure 18:
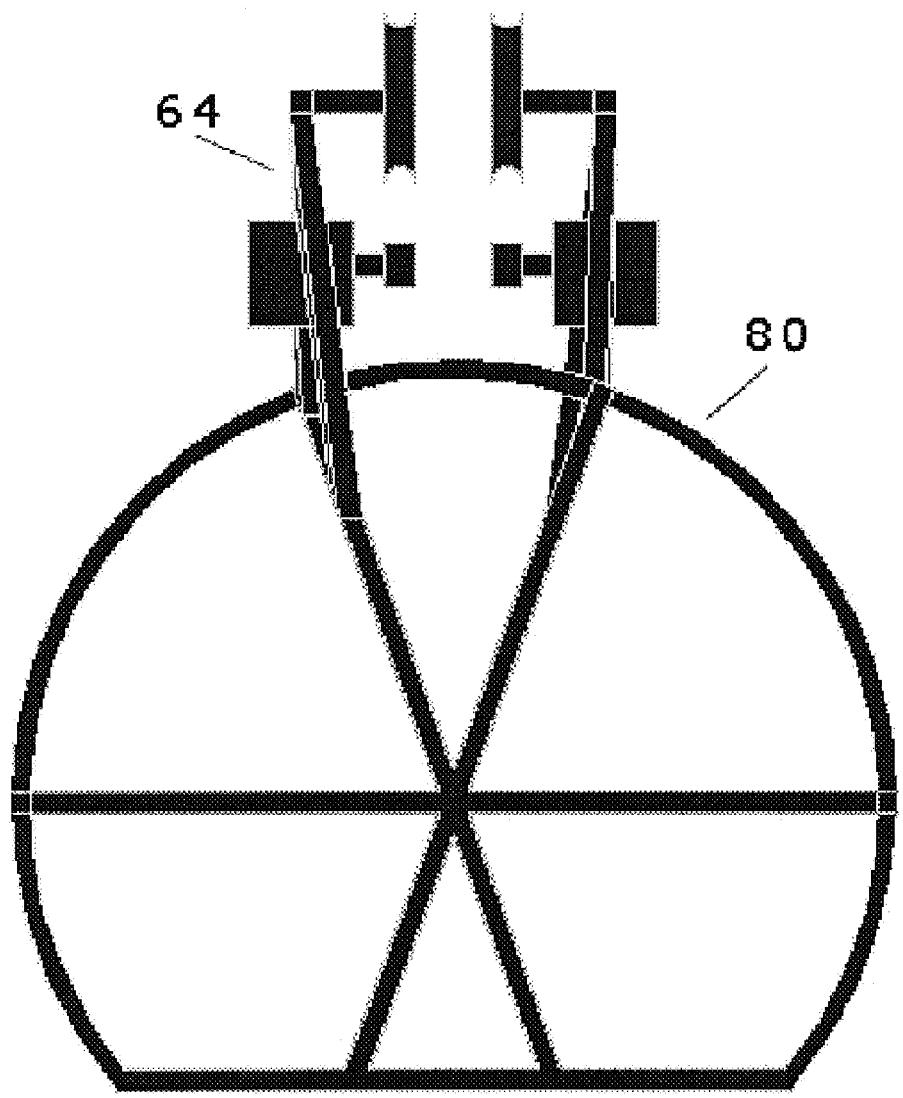
FIG. 18 Front view of JPod frame

The transit vehicles of one specific embodiment are ultra light, which we define as having an average Parasitic Energy Consumption (PEC) factor less than twenty (20). A goal PEC of 5 is achievable in many transportation networks. The intelligent transportation system is able to achieve this surprising PEC factor primarily by tailoring the transit vehicles to the network where it operates. The PEC value can also be lowered by taking into consideration the nature and needs of what is typically transported within the network. This tailoring eliminates unnecessary, inefficient, and excessive capacity and builds features into fixed structures. It uses lightweight materials in construction, minimizes onboard fuel, minimizes engine weight, and minimizes drive train weight. A very low-mass transit vehicle is constructed using steel, aluminum, carbon, plastic, or any other lightweight material. The frames 80 in FIGS. 16, 17 and 18 are tubular steel; this bicycle frame material is used because it provides a comfortable ride and is low in cost. There will be many specific instances where the needs of a specific transportation network are better met by constructing the frame using other materials. In another embodiment, the transit vehicle is constructed with a higher mass to reduce manufacturing cost or to better meet the transportations needs. Some efficiencies of the lighter weight transit vehicle are sacrificed to tailor to the needs of the network or what is transported. It will be obvious to one of ordinary skill in the art that many tradeoffs can be made between system efficiency and cost, and the invention is intended to encompass these tradeoffs. Regardless of how achieved, the present invention has a greatly reduced PEC factor compared to the comparatively inefficient transportation systems available to passengers today. Therefore, the present invention has a much lower cost of operation, while simultaneously reducing consumption of energy and reducing environmental impact.

In a specific embodiment of the invention, a standoff drive assembly 48 connects to the top of the transit vehicle, as shown in FIG. 5. In this embodiment, the mass of the motor 40 is below the rail 16 and the drive wheel 70 opposes the riding wheels 50 located on top of the rail 16. Gripping the rail 16 between the wheels improves stability, safety, and braking. The standoff drive assembly 64 is constructed of several parts, a standoff assembly 48, an electric motor with controls 40, a drive wheel 70, and a riding wheel 50. The standoff assembly 48 is constructed with a triangular shape frame 42, a motor mount 46, safety wheel 76, and a torsion ring 44 that swivels to compensate for turns, inclines, and declines. The motor mount 46 connects to the center or lower part of the frame 42. The torsion ring 44 connects to the top of the frame 42. The safety wheel 76 can be connected to whatever section of the frame 42 is safest, based on the network it operates in. The standoff assembly 48 connects to a mounting plate 82 located on top of the transit vehicle. An electric motor with controls 40 attaches to the top of the motor mount 46. Connected to the top of the standoff frame 42 is a torsion axle or shaft 52. The torsion shaft 52 connects the riding wheel 50 to the standoff assembly 48. The drive wheel 70 connects to the motor 40 by the drive shaft 72.

Transit vehicles have one or more riding wheels 50 and drive wheels 70. More preferably, the transit vehicle has at least three riding wheels 50 and two drive wheels 70 for safety and contingency reasons. In an alternative high-speed embodiment, offsetting the wheels on parallel rails 16 increases the spacing between switching events. The frame 80, in one embodiment, is incased in a shell 58 that best meets the tailored need of each specific transportation network. For example, commuters will need an aerodynamic shell 58, which protects passengers from the environment. The shell 58 will vary in materials used for construction. Example materials are laminates of fiberglass, graphite, Kevlar®, buckyballs, polypropylenes and other plastics. The transit vehicle, in one embodiment, has a sunroof, or an open top or windows. Alternatively, a display may show an image that appears to be a window with a view, but the passenger selects the view. In another embodiment, the frame is completely exposed; the GPod or the LPod are likely to be open. Environmental controls are considered. Electrical heating is the preferred embodiment. Heating via the chair is preferred for lowest cost/greatest comfort. Cooling can be accomplished by air circulation, air conditioning and/or providing water via the rail structure which is deployed on the vehicle to act as a swamp cooler. The objective is to have the lowest practical moving mass.

The transit vehicle has a means for selecting the desired trip. A trip encompasses the time of the trip, the start point, waypoints, destination, security features, and other factors. The trip is communicated to the transportation network. The means allows the user to specify the trip using voice input, or by a selection on a map or monitor or computer terminal, using any means of input, such as touch, a mouse or a pen, or by entering an address on a keyboard or using a stylus. The present invention is not limited to those means listed for selecting a trip. Other means for selecting a desired trip, such as entering a code or following a menu or others not specifically identified will be obvious to one skilled in the art, and the present invention encompasses these as well.

Inertial dampening should be considered where costs permit. A form of inertial dampening is to center a mass in the bottom of the vehicle for best leverage. Connect this mass to an actuation device which is triggered by a lateral inertial shift. When an inertia sensor is triggered the actuator moves the mass in an opposing direction at an appropriate speed. The mass is gradually returned to center when not actively engaged. Actuators of stepper motors or pneumatics are commercially available. Stepper motors are preferred. Other forms of inertial dampening will likely be developed.

Figure 4:
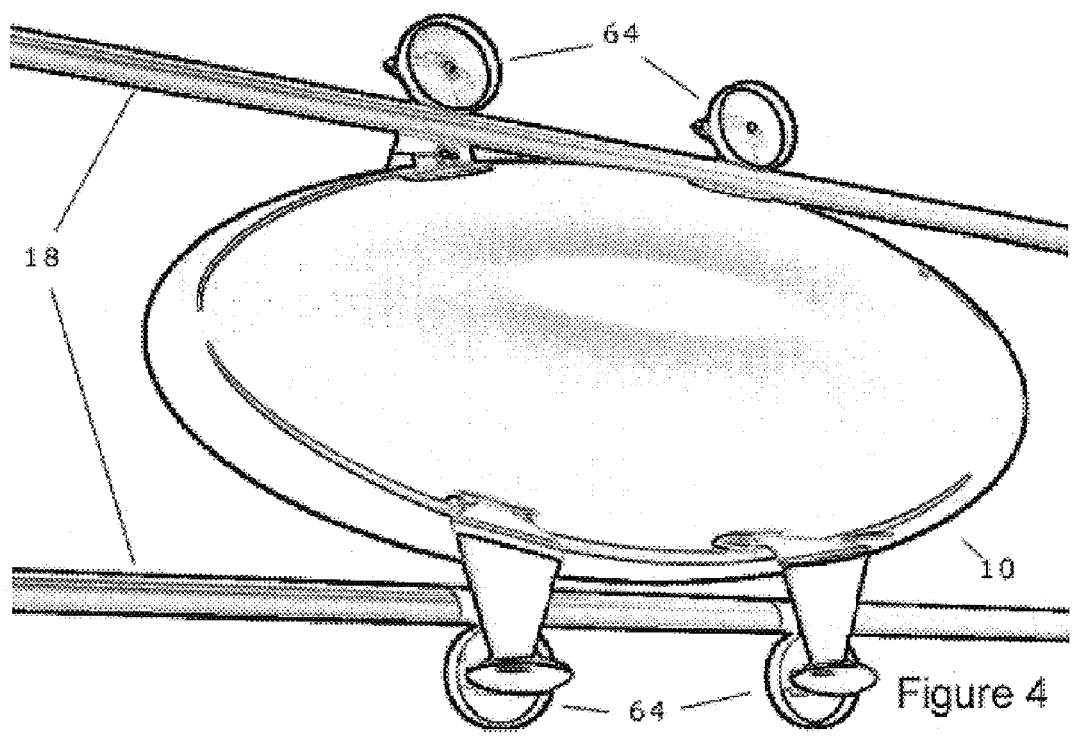
FIG. 4 Side view of opposing rails for low gravity implementations

In low-gravity environments, such as experienced in orbit or on the moon, or where changes in elevation of the transit vehicles occur, the drive wheel 70 can be held in place by a top rail 16, mechanically or magnetically as in FIG. 4. In another embodiment, the drive wheel 70 is eliminated altogether, replacing the conventional drive wheel 70 with inductive motion of a levitated transit vehicle. The lightweight mass of the transit vehicle could make levitation of the transit vehicle a realistic alternative. This is especially true in low gravity were ambient conditions support super conductor use and manufacturer. As super conductive and super insulator technologies are fielded and the energy cost of magnetic components become lower the cost of magnetic levitation may provide options for further mass reduction. To support the development of these technologies www.buckyballs.com, www.carbon60.com, www.carbon36.com and www.stickyballs.com have been created.

In a preferred embodiment of the transit vehicle, it has at least one electric motor 40 connected to a drive wheel 70 that propels it along the rail 16. Transit vehicles use electricity for power, but fossil fuels, fuel cells, and other power sources are likely to be used for specific purposes in specific environments. Fossil fuels may also power emergency transit vehicles, and other special application, although these devices can also use electricity. In some embodiments, an external source supplies the electricity. In other embodiments, the network has its own electric power supply. In yet another embodiment, the electric power generation is distributed on transit vehicles, and the transit vehicles are recharged or refueled when required. Electrical braking can return power to the grid. Another embodiment of this invention allows for the use of wind generators and solar panels to provide or augment power for the intelligent transportation system. The structure of the rail system may be used to support or expand the supports of the energy producing devices. In turn, the structure supporting the solar panels can provide shelter from wind and sun to the vehicles. The power could be generated from wind generators attached to the "T" shaped structure 74 or from solar panels located above and to the side of the rails 16 . The solar panels and wind generators can be attached to the intelligent transportation system in whatever manor is best suited to the network they are being applied.

Figure 20:
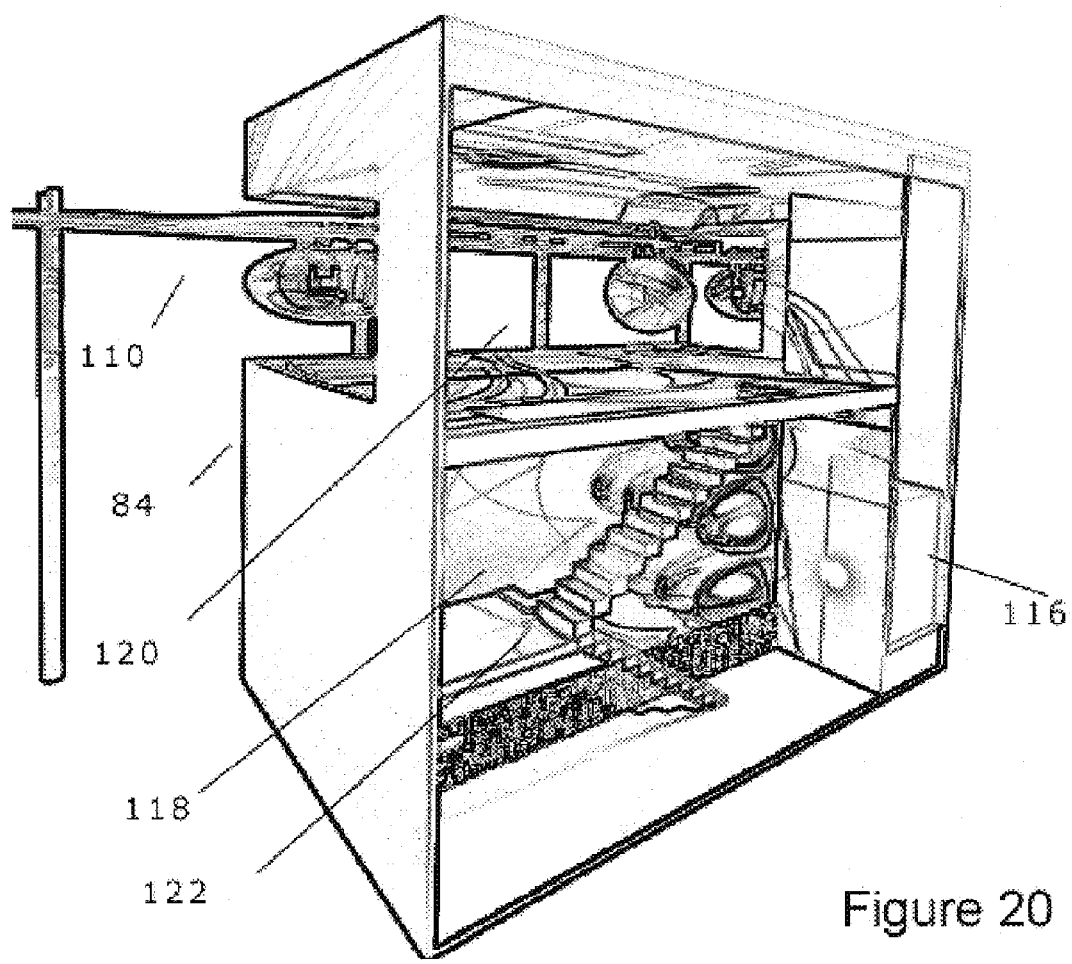
FIG. 20 Oblique upper view of a Station

The user of the intelligent transportation system accesses a transit vehicle at any authorized point. Station 84 can be built to put the load/unload point above existing traffic patterns, as shown in FIG. 20. More preferably and for lower costs where there is not a conflict with existing traffic, the rail system 16 has a separate ground level spur that allows entry to the transit vehicles at ground level. The transit vehicle would descend from traveling height to ground level. In this embodiment, automatic fencing and gating could keep passengers from accidentally entering the path of transit vehicles for ground level stations 84. When operating at ground level, obstruction sensors and passenger emergency stop capabilities are recommended. Alternatively, the intelligent transportation system would operate at ground level, replacing conventional streets. It can be set to allow loading/unloading at any safe point along the rails. Another embodiment would have passengers enter the transit vehicle from platforms connected to buildings above street level, the streets becoming pedestrian and bicycle greenways, eliminating automobile traffic in urban centers.

In one embodiment where the station 84 services elevated rails 16, the station 84 is designed to allow users easy access to the transit vehicle. The user will enter at ground level and can take either the stairs 122 or the elevator 116 to the upper level. The lower level could contain devices for requesting a trip, and other convenience items as needed by the specific transportation network. Once on the upper level, users will proceed to the load/unload area 120 to board the transit vehicle. The station 84 also has an area for storage 118 of private transit vehicles or transit vehicles not currently needed.

Figure 11:
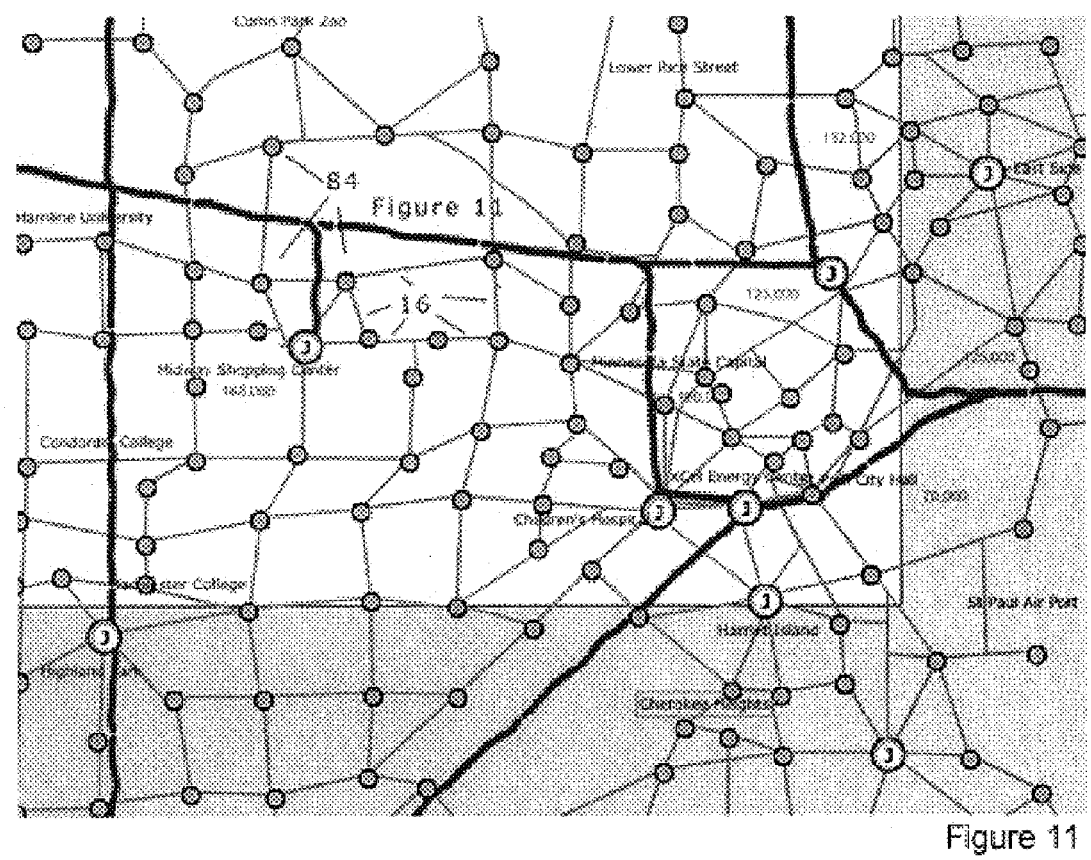
FIG. 11 Map to illustrate the high density of availability.

The embodiment of the commuter transit vehicle, the J-pod 10, illustrated in FIG. 1 shows a single chair. Another embodiment of the J-pod 10 could have no chair. Yet, another embodiment it could have a stool instead of a chair or the chair could be molded into the interior of the transit vehicle. Alternatively, the J-Pod 10 could have two or more chairs, stools or molded seats. In the commuter network, the majority of vehicles are single person. The commuter network contains a majority of one-person vehicles because during rush hour the average vehicle holds 1.08 persons. It is within the scope of the invention for the vehicle to be larger if the needs of the particular commuter network will be better met. The JPod 10 is aerodynamic as shown in FIGS. 1, 4, 8, 9, and 10. The inside of JPod 10 contains a computer 26 and, in a preferred embodiment of the commuter network, a touch screen 54. The JPod 10 also provides a storage area 22 for briefcases, bags, and other personal articles. In the commuter implementation, shown in FIG. 11, the addresses are conveniently located in a city and in suburbs.

Figure 2:
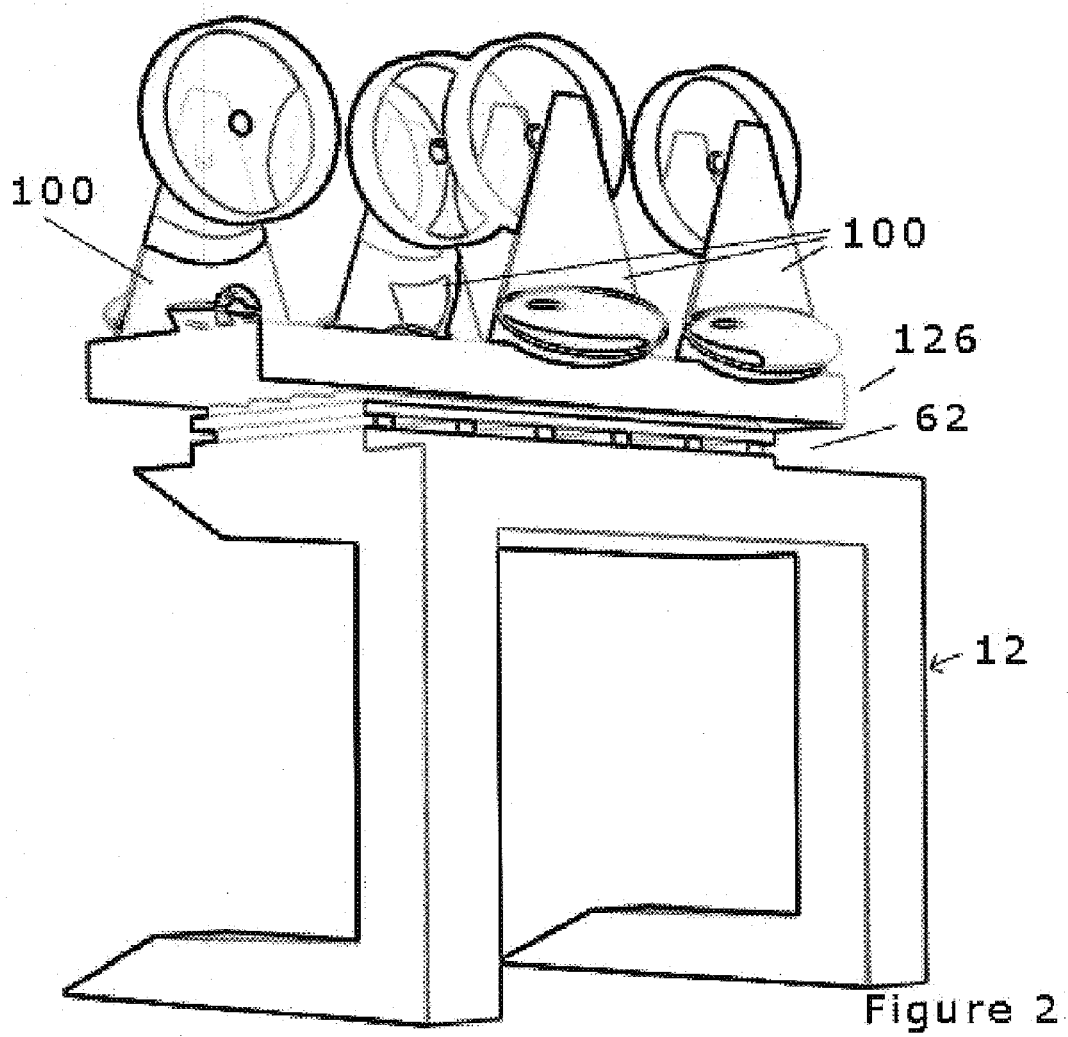
FIG. 2 Oblique view of CargoPod

Alternatively, in a different embodiment, the transit vehicle transports cargo. Cargo transit vehicles, CargoPods 12, operate based on the same concepts as other transit vehicles. They take on a wide variety of shapes and tailor their behaviors to the needs of a specific cargo network. As in a passenger network, every device and location has an address and can communicate with the appropriate devices in route between the origin and the destination. CargoPods used for transporting goods over distances will have an aerodynamic outer shell, similar to the JPod 10. In another embodiment, they are designed as intelligent pallet movers as illustrated in FIG. 2. The PEC objective of the cargo network is the same as a passenger network, less than 20. The CargoPods 12 are used manned and unmanned. Cargo-Pods 12 do not require that a touch screen, or input device, be located inside the cargo device for programming destination addresses, but have a data entry device on the exterior of the cargo device. Alternatively, they could have a data entry device external to the CargoPod 12.

Figure 12:
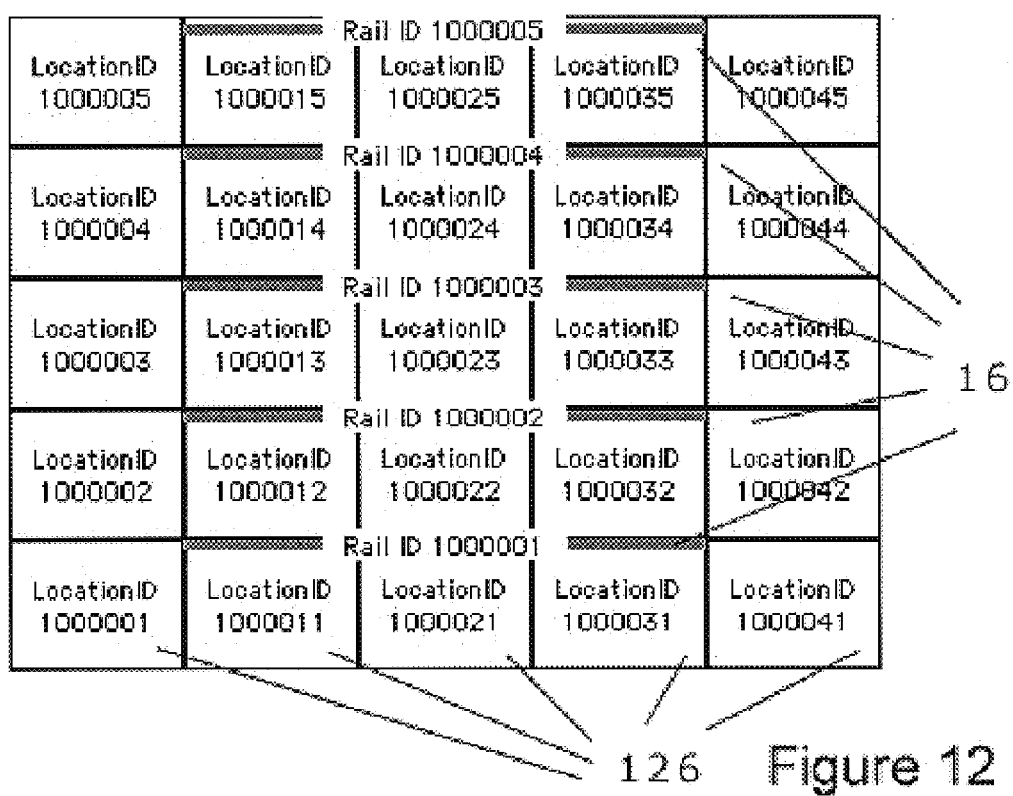
FIG. 12 Cargo network in factory or warehouse.
Figure 13:
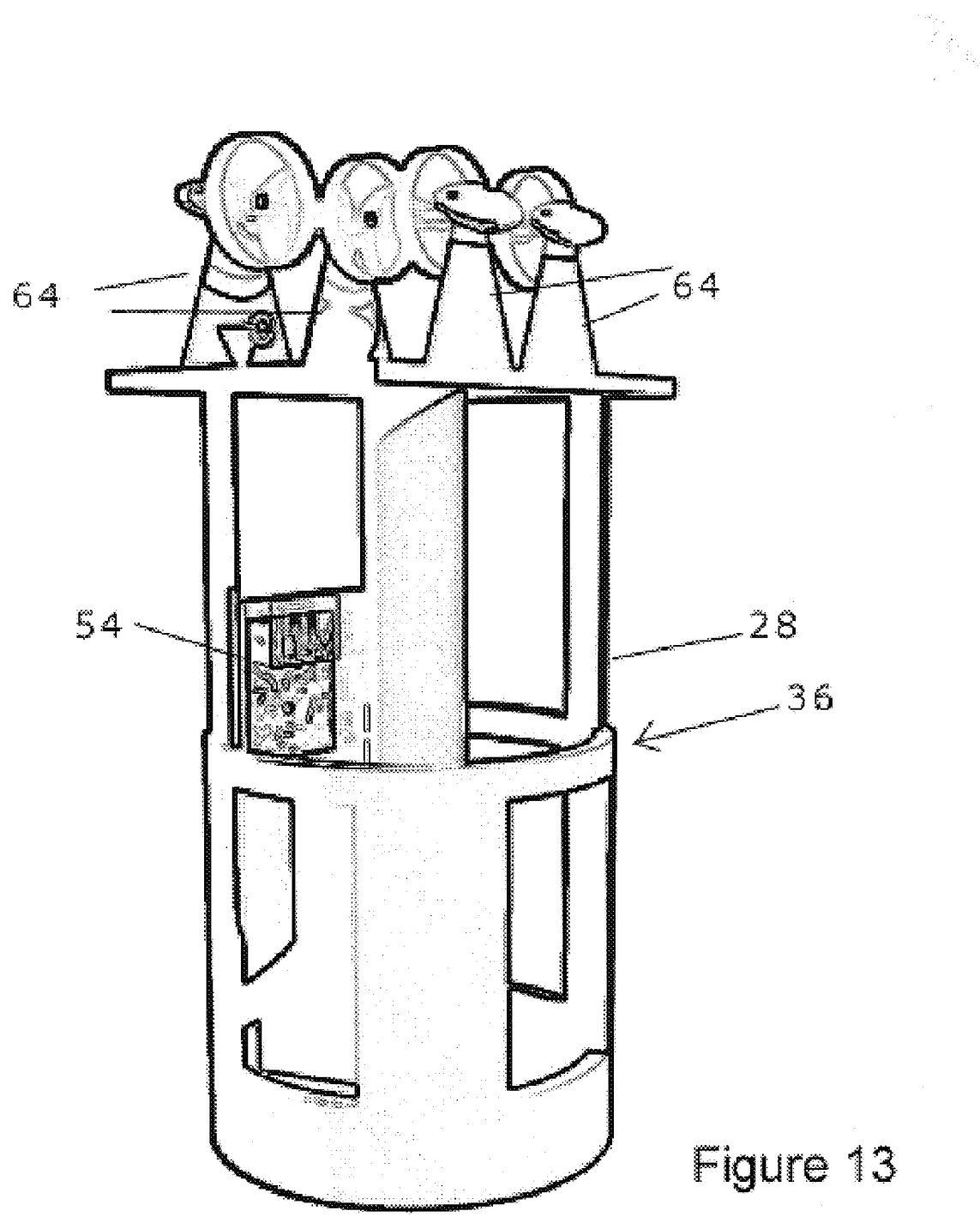
FIG. 13 Oblique view of a StandingPod

FIG. 2 illustrates a preferred embodiment of the CargoPod 12 tailored to meet the needs of cargo transported in a warehouse. In this embodiment, the CargoPod's 12 shape is very similar to the front end of a forklift. FIG. 12 shows how the warehouse or factory has several rows and columns of storage areas 124. Each storage area is a location and as such has a locationId 124. The CargoPod 12 is loaded and the destination locationId 124 inputted. The CargoPod 12 then carries its cargo to the locationId 124.

The CargoPod 12 is built with heavy-duty parts. The CargoPod 12 begins with a forklift structure 60. Connected to the forklift 60 is a center of gravity table 62, which is available commercially. A heavy-duty mounting plate 126 connects the standoff drive assembly 100 to the center of gravity table 62. The center of gravity table 62 attaches to the top of the CargoPod 12. The standoff drive assembly 100 is constructed of several parts, a heavy-duty standoff frame 102, a heavy-duty electric motor with controls 104, a heavy-duty drive wheel 90, a heavy-duty safety wheel 94, a heavy-duty torsion ring 98, and a heavy-duty riding wheel 108. The heavy-duty torsion ring 98 connects the frame 102 and the wheel torsion shaft 106. The torsion shaft 106 connects the heavy-duty riding wheel 108 to the standoff frame 102. The torsion ring 98 allows the standoff frame 102, thus the CargoPod 12, to move at a different angle than the riding wheels 108. The electric motor with controls 104 attaches to the standoff frame 102 with a motor mounting bracket 96.

Figure 3:
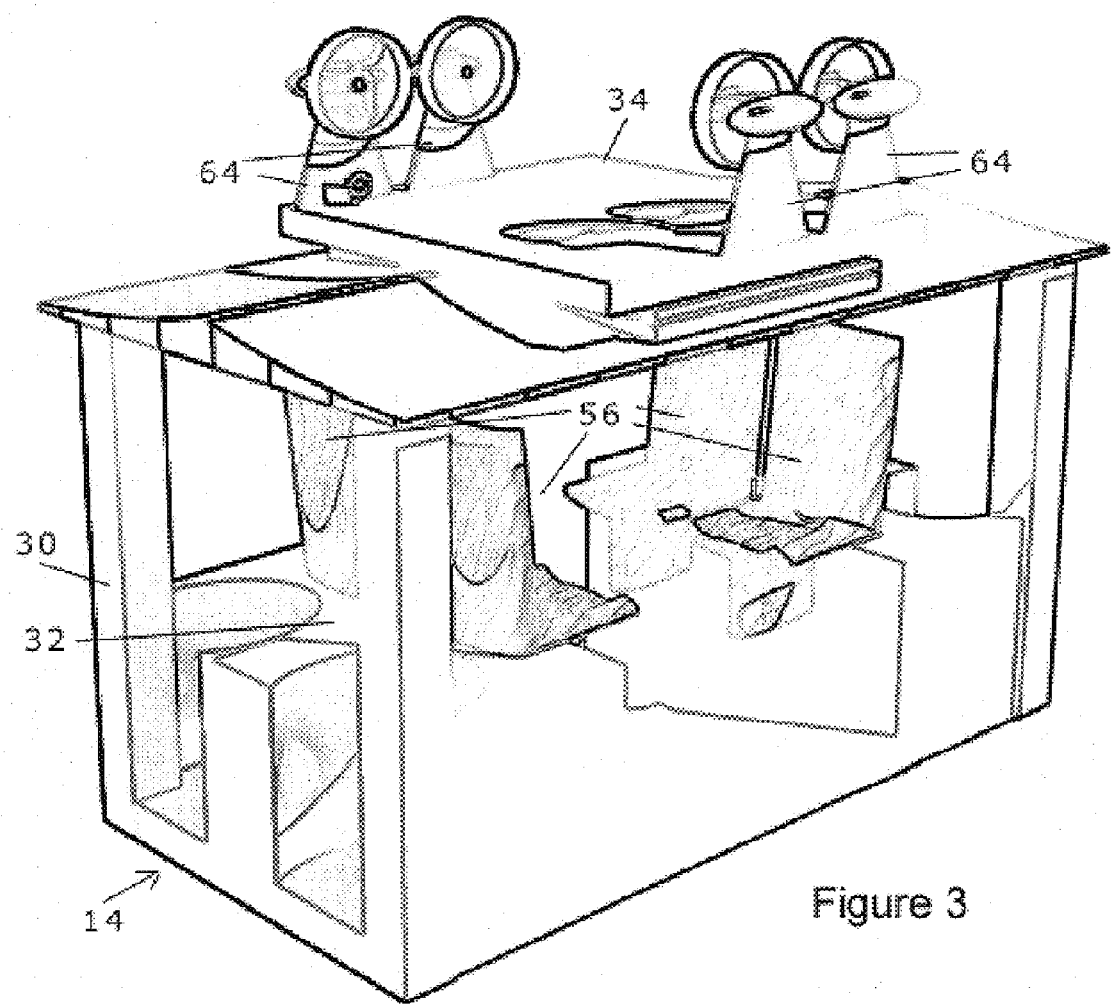
FIG. 3 Oblique view of LPod or LocalPod
Figure 14:
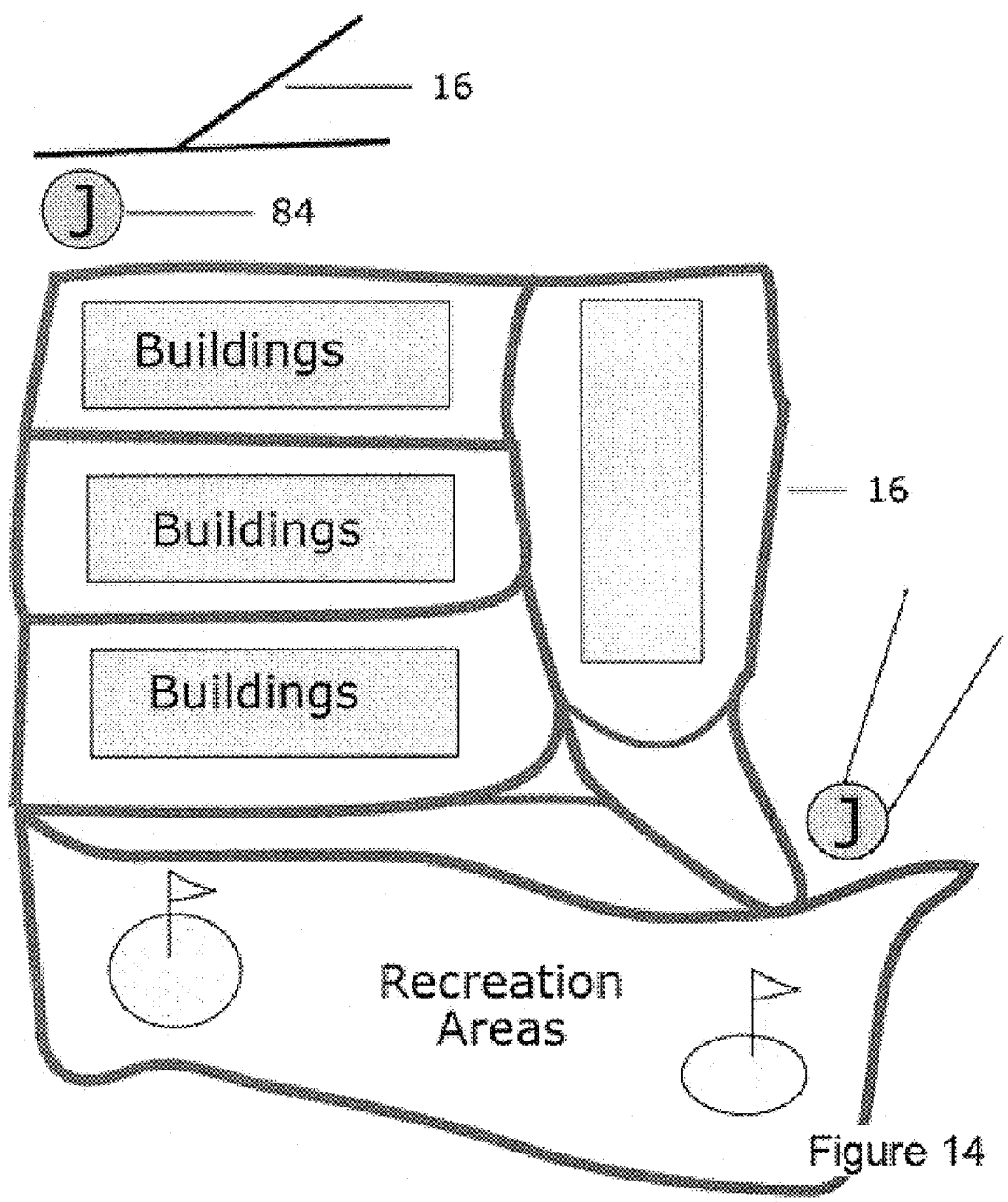
FIG. 14 Drawing of a complex with a local and recreational network.
Figure 15:
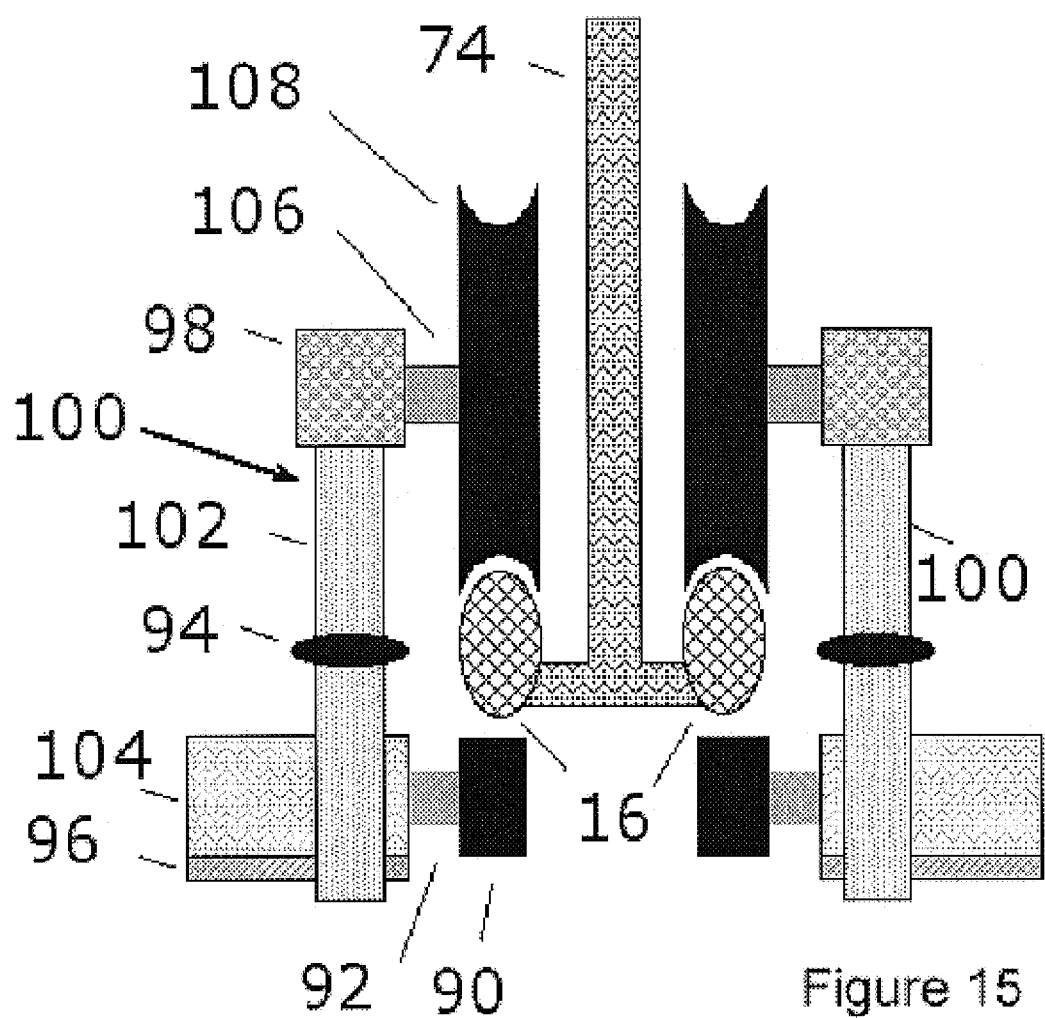
FIG. 15 Front view of a heavy-duty standoff drive assembly
Figure 31:
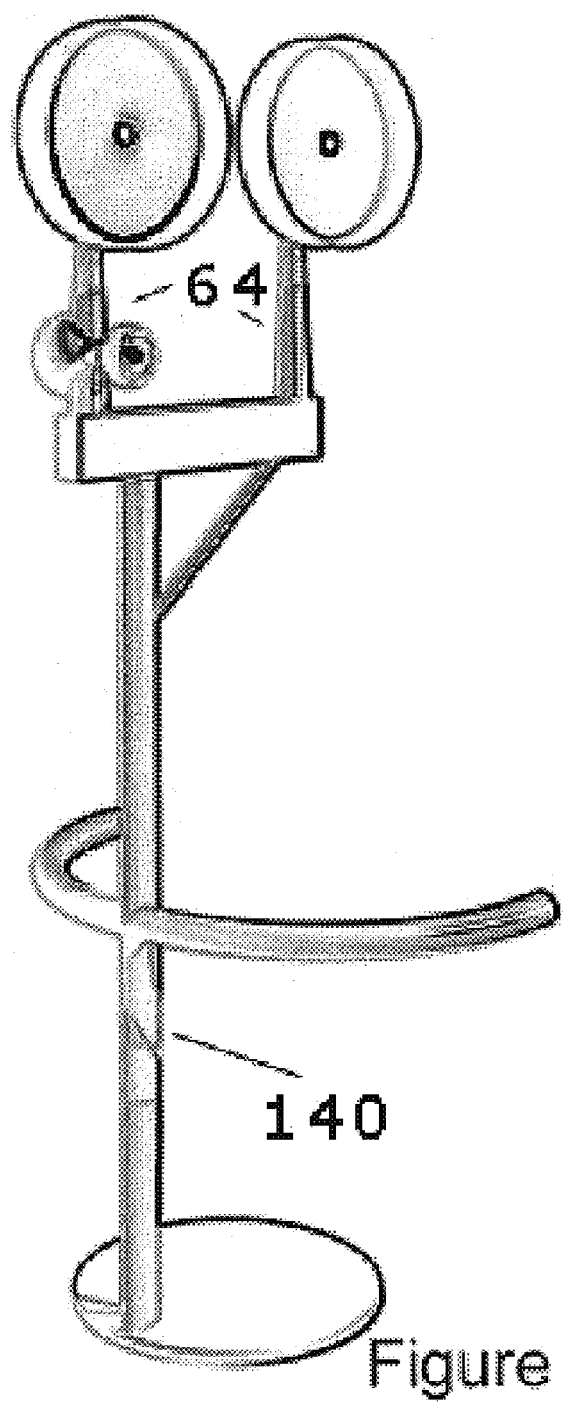
FIG. 31 Oblique view of iPod

FIGS. 3, 13, 14 and 31 illustrate other vehicles tailored to meet the PEC standard for use in the transportation system. FIG. 3 shows the GolfPod 14 or LPod 14. The LPod 14 is tailored to meet the needs of slow, near the ground, on and off transport that would be typical at a golf course, apartment complex, corporate campus, and other short trips. The vehicles are tailored to multiple people with cargo space for golf bags, groceries, and other typical passenger/cargo combinations. FIG. 14 shows the typical rail system 16 in a group of buildings and a recreation area. It is recommended that different tailored networks interface as illustrated with station 84, the interface between the local network and the commuter network. The GolfPod 14 or LPod 14 is usually open, constructed with just a frame 30, although in typically cold or bad weather areas a shell 32 would be constructed around the frame 30. The IPod 140 is illustrated in FIG. 31.

Transporting devices should be available to accommodate people with special needs. It is recommended that these devices vary to match needs. An example is a device with an interface to grip and use a wheel chair as part of its structure. Talking transit vehicles can accommodate those who are blind or have difficulty seeing on a similar basis. Multiple passenger transit vehicles are arranged in advance, if families desire to travel together with small children. There are many other configurations of transit vehicles that could be imagined by one skilled in the art, and these alternative embodiments are intended to be included in the invention.

CONCLUSION, RAMIFICATIONS, AND SCOPE OF INVENTION

It may seem that the invention herein disclosed covers a great many disciplines including structure, power, communications, computing, etc. all of which are not described in complete detail as the disclosure being made is for an entire system and each area of the entire system is within the ability of those skilled in the art. Further, as the system develops into a practical reality more effort will be expended and it is anticipated that the invention will include those developmental details.

The Intelligent Transportation system herein disclosed applies to distributed intelligent computing devices, network concepts and the concept of driving the moving mass in a transportation system towards zero (PEC) to make an inexpensive, energy efficient and environmentally safe on-demand transportation system.

Primary dependence on the automobile for getting to and from work provides the individual transit needed to support the American culture but has many environmental, congestion, construction and economic drawbacks. It moves a ton to move a person. The energy waste exposes the entire society to risks. The economy dependence alone carries risks of oil embargos and acts of terror.

Mass transportation is very expensive to build, requires long construction cycles and does not address the primary need for personal on-demand transit. Light rail costs approximately $30–$70 millions per mile with multi-year construction cycles. Intelligent Transportation's ultra-light rail can be constructed at multiple miles per day per installation team and costs approximately $1–2 million per mile.

Intelligent Transportation is compatible with the existing forms of transportation. It is inexpensive to build and maintain. It can be applied across entire cities or just to relieve choke points. It is estimated that the economic loss from congestion is $78 billion per year in the US. It is also estimated that for every $1 billion in transportation construction, 42,100 jobs are created. Spending the lost dollars to construct Intelligent Transportation will relieve congestion in approximately 20 cities and create 3.3 million jobs.

It is estimate that combining Intelligent Transportation with electric power plant construction could make the US energy independent by 2025.

The ramification of this invention is a more secure future in which the fundamental need of Americans for on-demand personal mobility is secured.

SEQUENCE LISTING

Not applicable

What is claimed is:

1. A method of controlling a transportation system for moving people, freight, and any combination whereof using a distributed network of intelligent devices without requiring the aid of a human driver, comprising the steps of:
   a) providing a plurality of said devices capable of various behaviors;
   b) providing behaviors which enables said devices to perform their varied tasks;
   c) providing a computing means which enable control of said behaviors within safety limits;
   d) providing a protocol which enables said devices to address, communicate and coordinate with other said devices without depending on centralized control;
   e) providing a communication means which enables coordinating activities among said devices;
   f) providing said devices with an event loop which enables managing said communication, said coordination, reporting status, executing behaviors, timing out of behaviors not executed with specific parameters, and executing emergency procedures;
   g) providing a first power means which enables operation of said transportation system;
   h) scheduling a trip as from a start point to an end point by using said communication means;
   i) documenting said trip by storing database records accessible to said devices involved in said trip using said computing means;
   j) providing a plurality of vehicles which are one of type of said devices whose behavior is tailored to transporting said people and said freight;
   k) providing a guiding means enabling said vehicles to carry said people or said freight on said trip;
   l) dispatching said vehicles using said guiding means to said start point to meet scheduled demand and projected demand;
   m) transporting said people or said freight on said trip using said vehicles and said guiding means;
   n) coordinating among said devices scheduled to participate in said trip;
   o) coordinating among said devices not part of said trip but share resources in approximately the same time period as said devices on said trip;
   p) timing out of said trip and initiating change actions if said trip is not executed within specified parameters using said behaviors.

2. The method claimed in 1 said guiding means further comprising of:
   a) providing a network of interconnected rails comprising: a plurality of main rails, a plurality of loading and unloading rails, a plurality of storage location rails;
   b) providing a plurality of switches connecting said rails;
   c) providing a plurality of load bearing structures which support said network of interconnected rails, said load bearing structures of various designs;
   d) manifesting behaviors in said rails, said switches, said load bearing structures which enable guiding the transporting of said vehicles on said trip;

e) coordinating by said vehicles with other said devices which are navigating said rails in the same timeframe using said communication and said protocol.

3. The method claimed in 2 said switches further comprising of:
   a) providing a plurality of sensors which enable said switches to identify various parameters of inbound vehicles, comprising of speed, location, mass, acceleration, deviation from said parameters;
   b) providing a plurality of sensors which enable said vehicles to identify various parameters of said trip, comprising of speed, distance to said switch, mass, acceleration, deviation from said parameters;
   c) manifesting behaviors in said switches which enables automated transferring of said vehicles among said rails;
   d) coordinating by said switches and said inbound vehicles with other said devices which are navigating said switch in the same timeframe using said communication and said protocol;
   e) communicating using said protocol enabling said switches and said inbound vehicles to identify each other and enabling coordination for correct entry and correct exit from said switches by said vehicles;
   f) managing emergency and normal shut down procedures if said communication is terminated or if actions do not occur within the time specified by said protocol which enables said switches and said vehicles to safely function.

4. The method claimed in 3 said devices further comprising of:
   a) providing a plurality of stations to facilitate the loading and unloading of said people and said freight;
   b) using said rails, said switches, said sensing, said computing, said protocol to operate said stations;
   c) forming said start point and said end point of said trip using said stations;
   d) manifesting physical control behaviors, sensing, computing, reporting within said stations to load and unload said vehicles.

5. The method claimed in 4 said devices further comprising of:
   a) providing a plurality of storage managers which enable the storage of unoccupied vehicles which are available for dispatch;
   b) using said protocol for addressing storage locations and said vehicles;
   c) providing storage addresses using said protocol;
   d) using said rails and said switches for transporting said vehicles to said storage addresses for storage;
   e) recalling said vehicles from said storage in response to said trip.

6. The method claimed in 2 said vehicles further comprising:
   a) providing designs of said vehicles that minimize the moving mass of said vehicles;
   b) providing said designs of said vehicles further enabling suspending said vehicles from said rails;
   c) providing said designs of said vehicles further enabling dynamic inertial dampening;
   d) providing said designs of said vehicles further tailored to the needs of the said people and said cargo.

7. The method claimed in 6 of said vehicles design further comprising:
   a) providing a formula for calculating the Parasitic Energy Consumption, PEC, of vehicle designs said formula equal to the square of the sum of said vehicle mass and said people mass and said cargo mass divided by the square of the sum of said people mass and side cargo mass;
   b) optimizing said design of said vehicles to meet the transport needs with the minimum practical said PEC value.

8. The method claimed in 7 said trip further comprising:
   a) providing a requester which is one of said devices whose behavior is tailored to requesting said trip, said requester of various behaviors;
   b) providing a negotiator which is one of said devices whose behavior is tailored to accumulating time based availability of said various devices;
   c) providing a scheduler which is one of said devices whose behavior is tailored to scheduling said trip;
   d) scheduling said trip using said scheduler by accepting input from said requester;
   e) negotiating with said negotiators to identify said devices reporting availability at the time required to execute said trip;
   f) booking an event or trip by reserving capacity in support of said trip with said devices;
   g) reporting by said devices to said negotiators to identify capacity in said transportation system;
   h) reporting by said devices states the safe condition of said transportation network;
   i) coordinating among said devices scheduled to support said trip to assure continued safe condition;
   j) coordinating among said vehicles using the same said switch or same said rail in the same time frame;
   k) reporting by said devices completion of participation of said trip or initiates the timeout aspect of said protocol;
   l) managing emergency conditions in accordance with said protocol to safely complete said trip.

9. The method claimed in 8 said trip further comprising:
   a) accumulating time based availability of said devices by said negotiators;
   b) scheduling and executing said trips to position vehicles in response to historical demand for trips.

10. The method claimed in 1 said first power means further comprising:
    a) providing a second power means which enables transferring said power sources from an electric power grid to said vehicles and said transportation system;
    b) providing a third power means comprising solar and wind power generators integrated into the physical structure of said transportation system augmenting first power means.

11. A method of managing a transportation system for moving people, freight, and any combination whereof using a distributed communication network, intelligent devices, a network of interconnected rails, and suspended vehicles comprising the steps of:
    a) providing a plurality and variety of said devices on said network, each of said devices able to perform specific behaviors;
    b) providing a protocol which said devices use for communicating among said devices;
    c) providing a computing means for said devices to store, retrieve and act on data required for said devices to execute said behavior;

d) providing an internal communication loop which enables said devices to report on availability, current status, required actions, maintenance actions, and emergency actions of said devices behavior;

e) providing specific behaviors for accumulating said devices availability by each of said devices and by region said devices are located in, accumulators; requesting a trip, requester; scheduling a trip and maintenance, scheduler; making a trip, vehicles; managing rails; switching rails, switch; loading and unloading of people or freight, station; locations along said rails, rail address; geographic locations of interest, way points;

f) reporting, continuously, by said devices on said availability using said communication loop;

g) accumulating said availability of said devices by said accumulators;

h) accumulating said availability of said accumulators into regional accumulators;

i) defining said data required for said trip at said requester;

j) coordinating between said requester and an available said scheduler and available said accumulators using said protocol to match availability of potential said regions and said devices within said regions to said data for said trip;

k) selecting specific said devices to involved in said trip by said scheduler;

l) recording a route for said trip by storing data into the said database of each one of said devices selected by said scheduler for said trip;

m) allocating said vehicles to make said trip at said loading station defined by said trip;

n) loading said vehicles at said loading station defined by said trip;

o) traveling by said vehicles along said route;

p) coordinating as said vehicles travels along said route among all devices controlling said route or traveling on said route at the same time;

q) unloading said vehicles at said end station defined by said trip;

r) dismissing said vehicles at said end station;

s) logging trip data by said devices engaged in said trip of data affecting their said behavior and said availability;

t) reporting availability of said devices engaged in said trip.

12. The method claimed in 11 said devices comprising of:

a) providing a plurality and variety of said vehicles which are able to transport individuals or individuals in groups of up to four and a plurality and variety of said vehicles which are able to transport freight;

b) providing said network of interconnected rails further comprising, a plurality of main rails, a plurality of loading and unloading rails, and a plurality of storage location rails;

c) providing a plurality of stations to facilitate the loading and unloading of said individuals and said freight, each of said stations located adjacent to said loading and unloading rails;

d) providing a plurality of switches to enable the transition of said vehicles from said main rails to a storage location or said loading and unloading rails, and from said storage location to said loading and unloading or said main rails, and also from said loading and unloading rails to said storage location or said main rails, and to enable the vehicles to change direction while transporting on said main rails;

e) a plurality of load bearing structures which support said network of interconnected rails and said plurality of switches;

f) a plurality of storage managers able to store unoccupied vehicles available for dispatch, each of said storage managers located adjacent to said storage location rails which are adjacent to said stations and said loading and unloading rails.

13. The method claimed in 12 said network of devices comprising:

a) providing a plurality of billing computers.

14. An on-demand transportation system to enable the non-stop transport of people and freight and any combination whereof, from a start point to an end point within the said transportation system without requiring the aid of a human driver, the system comprising of:

a) a plurality of intelligent devices capable of various behaviors;

b) a computing means for said devices to manifest behaviors which enables said devices to perform their varied tasks comprised of physical actions, sensing inputs, computing, communicating and coordinating tasks, reporting availability and logging results;

c) an event loop within said computing means enabling said devices managing communication, coordination, reporting status, executing said behaviors, timing out of said behaviors not executed with specific parameters, executing safety procedures;

d) a protocol means so said devices have a set of rules for addressing other said devices, messaging between said devices, formatting data, using data, passing data between said devices as they communicate and coordinate the activities of said transportation system independent of central control;

e) a communication means for transferring data between said devices;

f) a safety means based on said devices regularly reporting their availability, failure to report removes one of said devices from availability and initiates change actions by all other said devices that are scheduled to interact with any one of said devices;

g) an accumulating means to track the availability reported by said devices, scheduling future trips use this data to find devices which can support said future trips;

h) a plurality of various vehicles, which are the devices whose behavior is tailored to transporting said people and said freight on said trips;

i) a requesting means to request said trips from a variety of sources;

j) a scheduling means to accept data from said requesting means for said trip, to negotiate with said accumulating means, to reserve capacity in said computing means of each said devices that will participate in executing said trip;

k) a guiding means for directing said vehicles to carry said individuals and said freight on said trip, coordinating between all said devices scheduled to participate in said trip, responding to said safety means, coordinating with said devices not part of said trip but that share resources in approximately the same time period; timing out of said trip and initiating change action if said trip is not executed within specified parameters;

l) a load balancing means for dispatching vehicles to locations in anticipation of demand based on historical demand and current requests;

m) a storage means to remove said vehicles from said guiding means when not required to meet demand and returning them to the guiding means when required to meet demand;

n) a power means to enable each of said vehicles to travel from said start point to said end point.

15. The system claimed in 14 said guiding means further comprising of:

a) a network of interconnected rails comprising: a plurality of main rails, a plurality of loading and unloading rails, a plurality of storage location rails;

b) a plurality of switches connecting said rails;

c) a plurality of load bearing structures which support said network of interconnected rails, said load bearing structures of various designs;

d) a plurality of said behaviors in the said rails, said switches, said load bearing structures which enable guiding the transporting of said vehicles on said trip;

e) a conversation using said communication with said protocol to enable said vehicles to coordinate with other said devices which are navigating said rails in the same timeframe.

16. The system claimed in 14 said switches further comprising of:

a) providing a plurality of sensors which enable said switches to identify various parameters of inbound vehicles, comprising of speed, location, mass, acceleration, deviation from said parameters;

b) manifesting behaviors in said switches which enables automated transferring of said vehicles among said rails;

c) communicating using said protocol to enable said switches and said inbound vehicles to identify each other and to enable coordination for correct entry and correct exit from said switches by said vehicles;

d) managing emergency and normal shut down procedures if said communication is terminated or if actions do not occur within the time specified by said protocol which enables said switches and said vehicles to safely function.

17. The system claimed in 14 of said vehicle designs further comprising:

a) a design means formulated on calculating the Parasitic Energy Consumption, PEC, of vehicles from the formula the square of the sum of said vehicle mass and said people mass and said cargo mass divided by the square of the sum of said people mass and side cargo mass;

b) a design of said vehicles to meet the transport needs with the minimum practical said PEC value.

18. The system claimed in 14 said system further comprising:

a) A load balancing means for collecting the time based use of devices in said system that uses said trips to preposition said vehicles to meet projected demand.

19. The system claimed in 14 said first power means further comprising:

a) a second power means which enables transferring said power sources from an electric power grid to said vehicles and said transportation system;

b) a third power means comprising solar and wind power generators integrated into the physical structure of said transportation system augmenting first power means.

20. The system claimed in 14 said devices further comprising:

a) a plurality of storage managers which enable the storage of unoccupied vehicles which are not required to meet current demand;

b) said protocol for addressing storage locations and said vehicles;

c) said rails and said switches for transporting said vehicles to said storage addresses for storage;

d) said rails and said switches for transporting said vehicles from said storage addresses use in said system;

Whereby, an intelligent transportation system is created capable of moving people and freight having a plurality of points-of-presence including start points, destinations, vehicles, switches, sensors, guide ways, load bearing structures, stations, storage locations communicating according to a protocol having an addressing scheme, database records;

Whereby an individual can maintain the freedom of personal travel to go where he wants, when he wants, and with whom he wants. While increasing the safety of transportation because if the number of variables involved in transportation is reduced then the risk of accidents are significantly reduced.

* * * * *